United States Patent
Lam et al.

(10) Patent No.: US 7,167,766 B2
(45) Date of Patent: Jan. 23, 2007

(54) CONTROLLING A MATERIAL PROCESSING TOOL AND PERFORMANCE DATA

(75) Inventors: Hieu A. Lam, Richardson, TX (US); Hongyu Yue, Plano, TX (US)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 10/512,863

(22) PCT Filed: Jun. 27, 2003

(86) PCT No.: PCT/US03/16239

§ 371 (c)(1),
(2), (4) Date: Nov. 15, 2004

(87) PCT Pub. No.: WO2004/003822

PCT Pub. Date: Jan. 8, 2004

(65) Prior Publication Data

US 2005/0234574 A1    Oct. 20, 2005

Related U.S. Application Data

(60) Provisional application No. 60/391,966, filed on Jun. 28, 2002.

(51) Int. Cl.
*G06F 19/00* (2006.01)
(52) U.S. Cl. .......................... 700/96; 700/121; 700/29; 702/84; 702/182
(58) Field of Classification Search ................ 700/121, 700/33, 268, 44, 109, 32, 96, 108, 29; 430/30; 702/84, 182; 438/795, 692; 156/345, 12, 156/13
See application file for complete search history.

(56) References Cited

U.S. PATENT DOCUMENTS

| | | | |
|---|---|---|---|
| 5,591,299 A | 1/1997 | Seaton et al. | |
| 6,000,830 A | 12/1999 | Asano et al. | |
| 6,035,293 A | 3/2000 | Lantz et al. | |
| 6,249,712 B1* | 6/2001 | Boiquaye | 700/31 |
| 6,415,193 B1 | 7/2002 | Betawar et al. | |
| 6,917,433 B2* | 7/2005 | Levy et al. | 356/630 |
| 2002/0192966 A1* | 12/2002 | Shanmugasundram et al. | 438/692 |
| 2003/0045131 A1* | 3/2003 | Verbeke et al. | 438/795 |
| 2003/0228532 A1* | 12/2003 | Mui et al. | 430/30 |
| 2005/0007249 A1* | 1/2005 | Eryurek et al. | 340/511 |

* cited by examiner

*Primary Examiner*—Kidest Bahta
(74) *Attorney, Agent, or Firm*—Oblon, Spivak, McClelland, Maier & Neustadt, P.C.

(57) ABSTRACT

According to an embodiment of the present invention, a material processing systeme (1) including a process tool (10) and a process performance control system (100). The process performance control system (100) includes a process performance controller (55) coupled to the process tool (10), where the process performance controller (55) includes a process performance prediction model (110), a process recipe correction filter (120), a process controller (130), and process performance model correction algorithm (150). The process performance prediction model (110) is configured to receive tool data from a plurality of sensors coupled to process tool (10) and to predict process performance data. The process recipe correction filter (120) is coupled to the process performance prediction model (110) and configured to receive predicted process performance data and generate a process recipe correction for run-to-run process control. The process controller (130) is coupled to the process recipe correction filter (120) and is configured to update a process recipe according to the process recipe correction.

33 Claims, 21 Drawing Sheets

CONTROLLING A MATERIAL PROCESSING TOOL AND PERFORMANCE DATA

CROSS-REFERENCE TO RELATED APPLICATIONS

The present application claims priority to previously filed U.S. application Ser. No. 60/391,966, filed on Jun. 28, 2002. This application is related to U.S. application Ser. No. 60/391,965, filed on Jun. 28, 2002. The entire contents of these applications are incorporated herein by reference.

FIELD OF THE INVENTION

The present invention relates to material processing and more particularly to a process performance control system and method thereof for controlling a process in a material processing system.

BACKGROUND OF THE INVENTION

One area of material processing in the semiconductor industry which presents formidable challenges is, for example, the manufacture of integrated circuits (ICs). Demands for increasing the speed of ICs in general, and memory devices in particular, force semiconductor manufacturers to make devices smaller and smaller on the substrate surface. Moreover, in order to reduce fabrication costs, it is necessary to reduce the number of steps (e.g., etch steps, deposition steps, etc.) required to produce an IC structure and, hence, reduce the overall complexity of the IC structure and the fabrication methods thereof. These demands are further exacerbated by both the reduction in feature size and the increase of substrate size (i.e., 200 mm to 300 mm and greater), which places greater emphasis on critical dimensions (CD), process rate and process uniformity to maximize the yield of superior devices. through inter-level dielectric layers. Usually, an etch stop layer is placed under a dielectric layer in order to protect the underlying layers (devices) from being damaged during over-etching. An etch stop layer generally includes a material that when exposed to the chemistry utilized for etching the dielectric layer has an etch rate less than the dielectric layer etch rate (i.e., the etch chemistry has a high etch selectivity to the dielectric layer relative to the etch stop layer). Furthermore, the etch stop layer provides a barrier for permitting an over-etch step to assure that all features on the substrate are etched to the same depth.

However, the etch stop layer complicates the process integration, increases manufacturing cost and decreases device performance. Without an etch stop layer, etch depth can vary depending on etch rate (ER) since fixed-time recipes are used. Since, for example, the etch tool is subject to equipment disturbance, the etch rate can change significantly over maintenance cycles. In order to maintain a constant etch rate, frequent tool qualification and maintenance procedures are required. Therefore, in-situ estimation of the etch rate can determine whether the process chamber is in a normal condition and can provide information to control the etch time so that the etch depth is on target.

SUMMARY OF THE INVENTION

The present invention provides for a material processing system comprising a process tool and a process performance control system. The process performance control system comprises a process performance controller coupled to the process tool, where the process performance controller comprises a process performance prediction model configured to receive tool data from a plurality of sensors and configured to predict process performance data. The process performance control system further comprises a process recipe correction filter coupled to the process performance prediction model, configured to receive predicted process performance data and configured to generate a process recipe correction, and a process controller coupled to the process recipe correction filter, configured to receive the process recipe correction and update the process recipe using the process recipe correction.

The present invention advantageously provides a process performance control system that further comprises a metrology tool coupled to the process tool and the process performance controller, configured to receive substrates processed within the process tool and configured to measure process performance data. The process performance controller further comprises a process performance model correction algorithm configured to receive measured process performance data and coupled to the process performance prediction model in order to provide an adjustment of the process performance prediction model.

The present invention advantageously provides a method for controlling a process tool of a material processing system. The method comprises the steps of executing a first process in the process tool, recording tool data for the first process, where the tool data comprises a plurality of tool data parameters, and predicting process performance data from the tool data for the first process using a process performance prediction model, where the process performance data comprises one or more process performance data parameters. The method further comprises the steps of determining a process recipe correction from the predicted process performance data using a process recipe correction filter, updating the process recipe by incorporating the process recipe correction using a process controller coupled to the process tool, and executing a second process in the process tool using the updated process recipe.

BRIEF DESCRIPTION OF THE DRAWINGS

These and other advantages of the invention will become more apparent and more readily appreciated from the following detailed description of the exemplary embodiments of the invention taken in conjunction with the accompanying drawings, where.

DETAILED DESCRIPTION OF PREFERRED EMBODIMENTS

Figure 1:
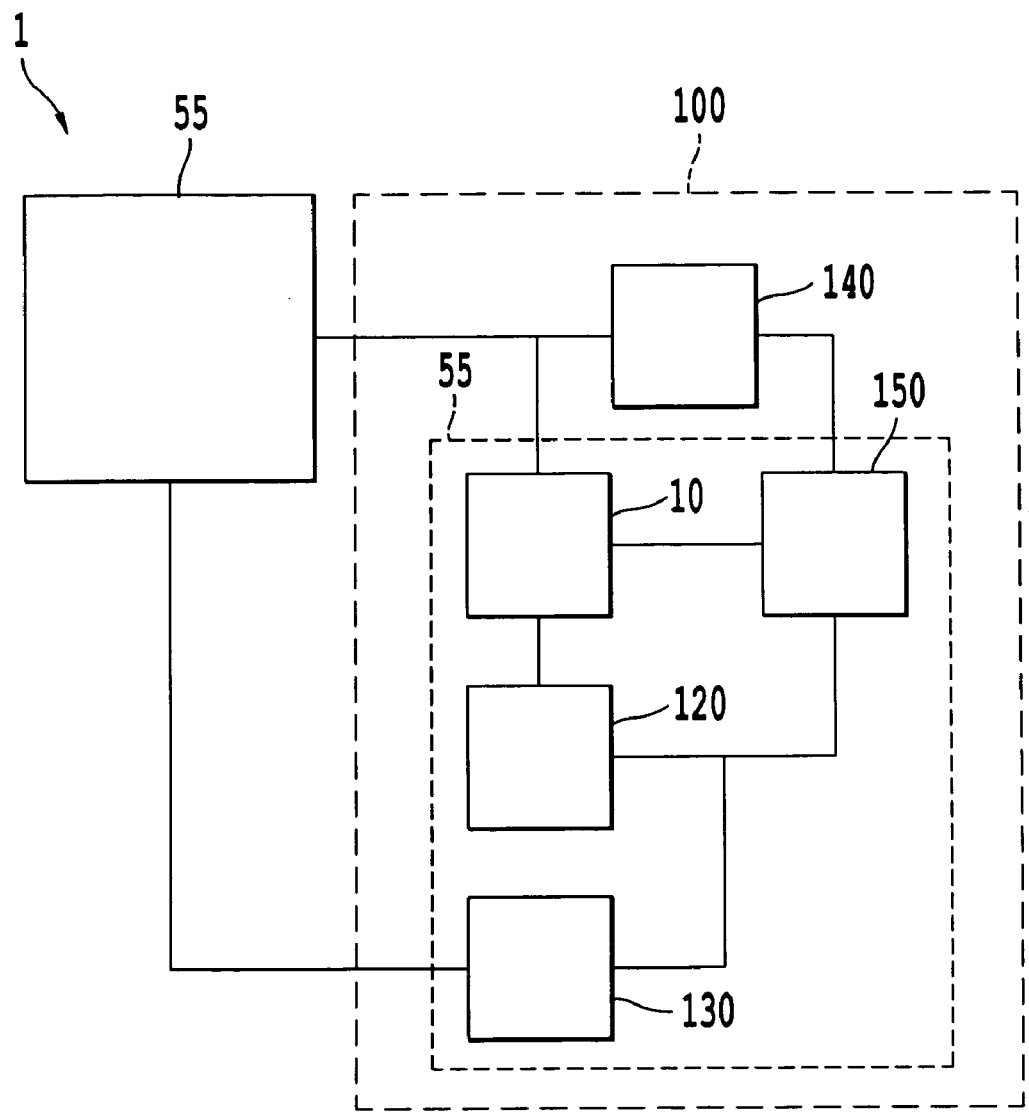
FIG. 1 shows a material processing system according to a preferred embodiment of the present invention.

According to an embodiment of the present invention, a material processing system 1 is depicted in FIG. 1 including a process tool 10 and a process performance control system 100. The process performance control system 100 includes a process performance controller 55 coupled to the process tool 10, where the process performance controller 55 includes a process performance prediction model 110, a process recipe correction filter 120, a process controller 130, and a process performance model correction algorithm 150. The process performance prediction model 110 is configured to receive tool data from a plurality of sensors coupled to process tool 10 and to predict process performance data. The process recipe correction filter 120 is coupled to the process performance prediction model 110 and configured to receive predicted process performance data and generate a process recipe correction for run-to-run process control. The process controller 130 is coupled to the process recipe correction filter 120 and is configured to update a process recipe according to the process recipe correction.

In addition, the process performance control system 100 can further include a metrology tool 140, and the process performance controller 55 can further include a process performance model correction algorithm 150. Metrology tool 140 can be coupled to the process tool 10 and to the process performance controller 55, and metrology tool 140 can be configured to receive substrates processed within the process tool 10 and to measure process performance data. The process performance correction algorithm 150 can be configured to receive measured process performance data from the metrology tool 140, and the process performance correction algorithm 150 can be coupled to process performance prediction model 110 in order to provide an adjustment of the process performance prediction model 110.

Figure 2:
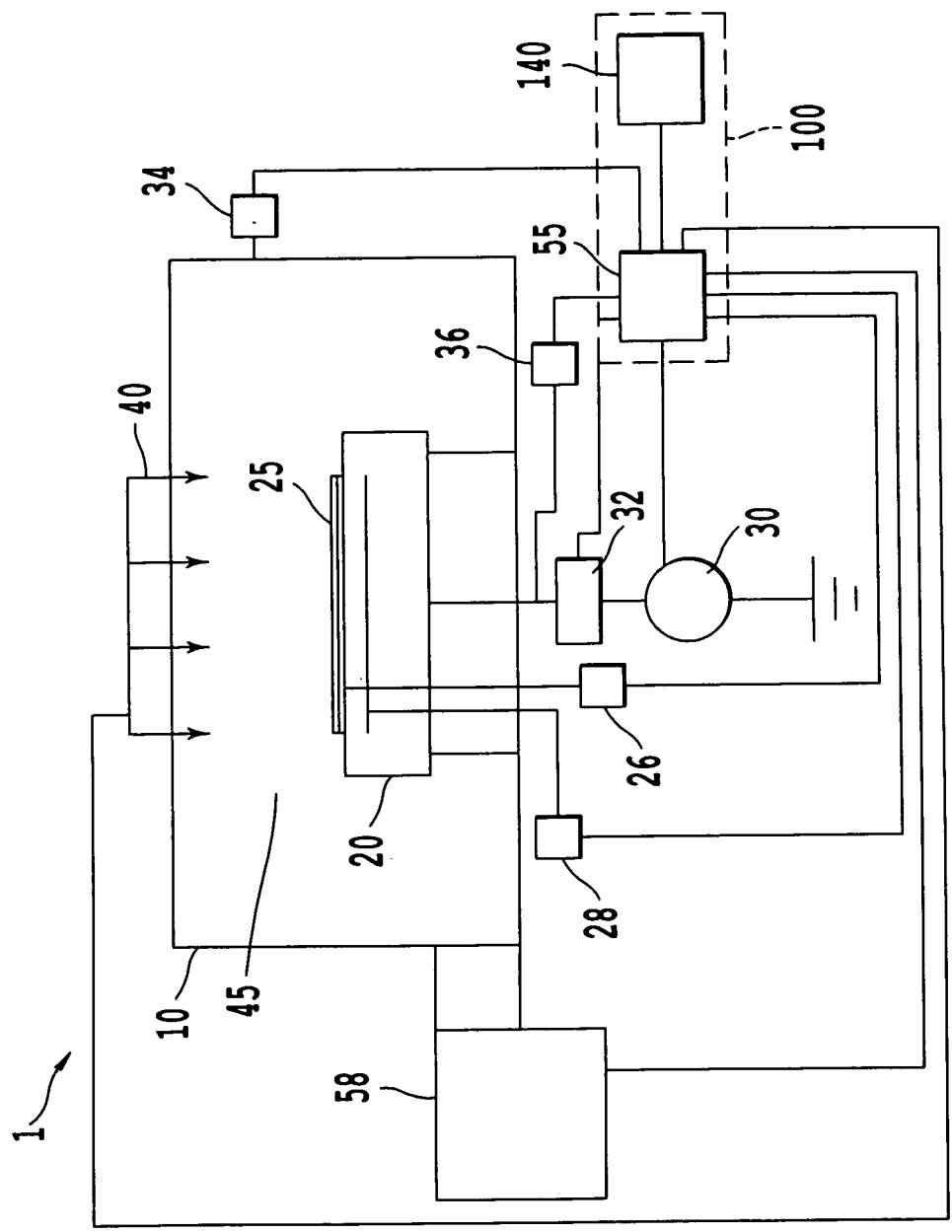
FIG. 2 shows a material processing system according to one embodiment of the present invention.

In the illustrated embodiment depicted in FIG. 2, material processing system 1 can utilize a plasma for material processing. For example, the material processing system 1 includes an etch chamber acting as a process tool 10a. Alternately, material processing system 1 can include other process tools 10 such as a photoresist coating chamber such as a photoresist spin coating system; a photoresist patterning chamber such as an ultraviolet (UV) lithography system; a dielectric coating chamber such as a spin-on-glass (SOG) or spin-on-dielectric (SOD) system; a deposition chamber such as a chemical vapor deposition (CVD) system or a physical vapor deposition (PVD) system; a rapid thermal processing (TP) chamber such as a RTP system for thermal annealing; or a batch diffusion furnace.

As shown in FIG. 2, when material processing system 1 includes an etch or deposition chamber as a process tool 10, the system often further includes substrate holder 20, upon which a substrate 25 to be processed is affixed, gas injection system 40, and vacuum pumping system 58. Substrate 25 can be, for example, a semiconductor substrate, a wafer, or a liquid crystal display (LCD). Process tool 10 can be, for example, configured to facilitate the generation of plasma in processing region 45 adjacent a surface of substrate 25, where plasma is formed via collisions between heated electrons and an ionizable gas. For example, an ionizable gas or mixture of gases can be introduced via gas injection system 40 and the process pressure can be adjusted using vacuum pumping system 58. Desirably, plasma is utilized to create materials specific to a predetermined materials process, and to aid either the deposition of material to substrate 25 or the removal of material from the exposed surfaces of substrate 25.

For example, the substrate 25 can be affixed to the substrate holder 20 via an electrostatic clamping system 28. Furthermore, substrate holder 20 can further include a cooling system including a re-circulating coolant flow that receives heat from substrate holder 20 and transfers heat to a heat exchanger system (not shown), or when heating, transfers heat from the heat exchanger system. Moreover, gas can be delivered to the back-side of the substrate via a backside gas system 26 to improve the gas-gap thermal conductance between substrate 25 and substrate holder 20. Such a system can be utilized when temperature control of the substrate is required at elevated or reduced temperatures. For example, temperature control of the substrate can be useful at temperatures in excess of the steady-state temperature achieved due to a balance of the heat flux delivered to the substrate 25 from the plasma and the heat flux removed from substrate 25 by conduction to the substrate holder 20. In other embodiments, heating elements, such as resistive heating elements, or thermoelectric heaters/coolers can be included.

In the exemplary embodiment shown in FIG. 2, substrate holder 20 can further serve as an electrode through which radio frequency (RF) power is coupled to plasma in processing region 45. For example, substrate holder 20 can be electrically biased at an RF voltage via the transmission of RF power from RF generator 30 through impedance match network 32 to substrate holder 20. The RF bias can serve to heat electrons to form and maintain plasma. In this configuration, the system can operate as a reactive ion etch (RIE) reactor, where the chamber and upper gas injection electrode serve as ground surfaces. A typical frequency for the RF bias can range from 1 MHz to 100 MHz and is preferably 13.56 MHz.

Alternately, RF power can be applied to the substrate holder electrode at multiple frequencies. Furthermore, impedance match network 32 can serve to maximize the transfer of RF power to plasma in processing chamber 10 by minimizing the reflected power. Various match network topologies (e.g., L-type, π-type, T-type, etc.) and automatic control methods can be utilized.

With continuing reference to FIG. 2, process gas can be introduced to processing region 45 through gas injection system 40. Process gas can, for example, include a mixture of gases such as argon, $CF_4$ and $O_2$, or argon, $C_4F_8$ and $O_2$ for oxide etch applications, or other chemistries such as $O_2/CO/Ar/C_4F_8$, $O_2/CO/AR/C_5F_8$, $O_2/CO/Ar/C_4F_6$, $O_2/Ar/C_4F_6$, $N_2/H_2$. Gas injection system 40 can include a showerhead, where process gas is supplied from a gas delivery system (not shown) to the processing region 45 through a gas injection plenum (not shown), a series of baffle plates (not shown) and a multi-orifice showerhead gas injection plate (not shown).

Vacuum pump system 58 can, for example, include a turbo-molecular vacuum pump (TMP) capable of a pumping speed up to 5000 liters per second (and greater) and a gate valve for throttling the chamber pressure. In related plasma processing devices utilized for dry plasma etch, a 1000 to 3000 liter per second TMP is generally employed. TMPs are useful for low pressure processing, typically less than 50 mTorr. At higher pressures, the TMP pumping speed falls off dramatically. For high pressure processing (i.e., greater than 100 mTorr), a mechanical booster pump and dry roughing pump can be used. Furthermore, a device for monitoring chamber pressure (not shown) is coupled to the process chamber 16. The pressure measuring device can be, for example, a Type 628B Baratron absolute capacitance manometer commercially available from MKS Instruments, Inc. (Andover, Mass.).

As depicted in FIG. 1, the process performance control system 100 includes a process performance controller 55 coupled to the process tool 10 and configured to receive tool data from a plurality of sensors. The plurality of sensors can include both sensors that are intrinsic to the process tool 10 and sensors extrinsic to the process tool 10. Sensors intrinsic to the process tool 10 can include those sensors pertaining to the functionality of the process tool 10 such as the measurement of the Helium backside gas pressure, Helium backside flow, electrostatic clamping (ESC) voltage, ESC current, substrate holder 20 temperature (or lower electrode (LEL) temperature), coolant temperature, upper electrode (UEL) temperature, forward RF power, reflected RF power, RF self-induced DC bias, RF peak-to-peak voltage, chamber wall temperature, process gas flow rates, process gas partial pressures, chamber pressure, capacitor settings (i.e., $C_1$ and $C_2$ positions), a focus ring thickness, RF hours, focus ring RF hours, and any statistic thereof. Alternatively, sensors extrinsic to process tool 10 can include those not directly related to the functionality of process tool 10 such as, for example, a light detection device 34 for monitoring the light emitted from the plasma in processing region 45 as shown in FIG. 2, or an electrical measurement device 36 for monitoring the electrical system of process tool 10 as shown in FIG. 2.

For example, light detection device 34 can include a detector such as a (silicon) photodiode or a photomultiplier tube (PMT) for measuring the total light intensity emitted from the plasma. It can further include an optical filter such as a narrow-band interference filter. In an alternate embodiment, light detection device 34 can include a line CCD (charge coupled device) or CID (charge injection device) array and a light dispersing device such as a grating or a prism. Additionally, light detection device 34 can include a monochromator (e.g., grating/detector system) for measuring light at a given wavelength, or a spectrometer (e.g., with a rotating grating) for measuring the light spectrum such as, for example, the device described in U.S. Pat. No. 5,888,337.

For example, the light detection device 34 can include a high resolution OES sensor from Peak Sensor Systems. Such an OES sensor has a broad spectrum that spans the ultraviolet (UV), visible (VIS) and near infrared (NIR) light spectrums. The resolution is approximately 1.4 Angstroms, that is, the sensor is capable of collecting 5550 wavelengths from 240 to 1000 nm. The sensor is equipped with high sensitivity miniature fiber optic UV-VIS-NIR spectrometers which are, in turn, integrated with 2048 pixel linear CCD arrays.

The spectrometers receive light transmitted through single and bundled optical fibers, where the light output from the optical fibers is dispersed across the line CCD array using a fixed grating. Similar to the configuration described above, light emitting through an optical vacuum window is focused onto the input end of the optical fibers via a convex spherical lens. Three spectrometers, each specifically tuned for a given spectral range (UV, VIS and NIR), form a sensor for a process chamber. Each spectrometer includes an independent A/D converter. And lastly, depending upon the sensor utilization, a full emission spectrum can be recorded every 0.1 to 1.0 seconds.

The electrical measurement device 36 can include, for example, a current and/or voltage probe for monitoring an electrical property, such as voltage, current, impedance and phase, of the electrical system including the processing region 45, a power meter, or spectrum analyzer. For example, plasma processing systems often employ RF power to form plasma, in which case, an RF transmission line, such as, for instance, a coaxial cable or structure, is employed to couple RE energy to the plasma through an electrical coupling element (i.e., inductive coil, electrode, etc.). Electrical measurements using, for example, a current-voltage probe, can be exercised anywhere within the electrical (RF) circuit, such as within an RE transmission line. Furthermore, the measurement of an electrical signal, such as a time trace of voltage or current, permits the transformation of the signal into frequency space using discrete Fourier series representation (assuming a periodic signal). Thereafter, the Fourier spectrum (or for a time varying signal, the frequency spectrum) can be monitored and analyzed to characterize the state of material processing system 1. A voltage-current probe can be, for example, a device as described in detail in pending U.S. application Ser. No. 60/259,862 filed on Jan. 8, 2001, and U.S. Pat. No. 5,467,013, each of which is incorporated herein by reference in its entirety.

In alternate embodiments, electrical measurement device 36 can comprise a broadband RF antenna useful for measuring a radiated RE field external to material processing system 1. A commercially available broadband RF antenna is a broadband antenna such as Antenna Research Model RAM-220 (0.1 MHz to 300 MHz).

In general, the plurality of sensors can include any number of sensors, intrinsic and extrinsic, and can be coupled to process tool 10 to provide tool data to the process performance controller 55 of the process performance control system 100.

As described above, the process performance control system 100 includes process performance controller 55. The process performance controller 55 can include a microprocessor, memory, and a digital I/O port (potentially including D/A and/or A/D converters) capable of generating control voltages sufficient to communicate and activate inputs to material processing system 1 as well as monitor outputs from material processing system 1. Moreover, process performance controller 55 is coupled to and exchanges information with RF generator 30, impedance match network 32, gas injection system 40, vacuum pump system 58, backside gas delivery system 26, electrostatic clamping system 28, light detection device 34, and electrical measurement device 36. A program stored in the memory is utilized to activate the inputs to the aforementioned components of a material processing system 1 according to a stored process recipe. One example of process performance controller 55 is a DELL PRECISION WORKSTATION 530™, available from Dell Corporation, Austin, Tex. Alternately, process performance controller 55 can comprise a Digital Signal Processor (DSP).

Figure 3:
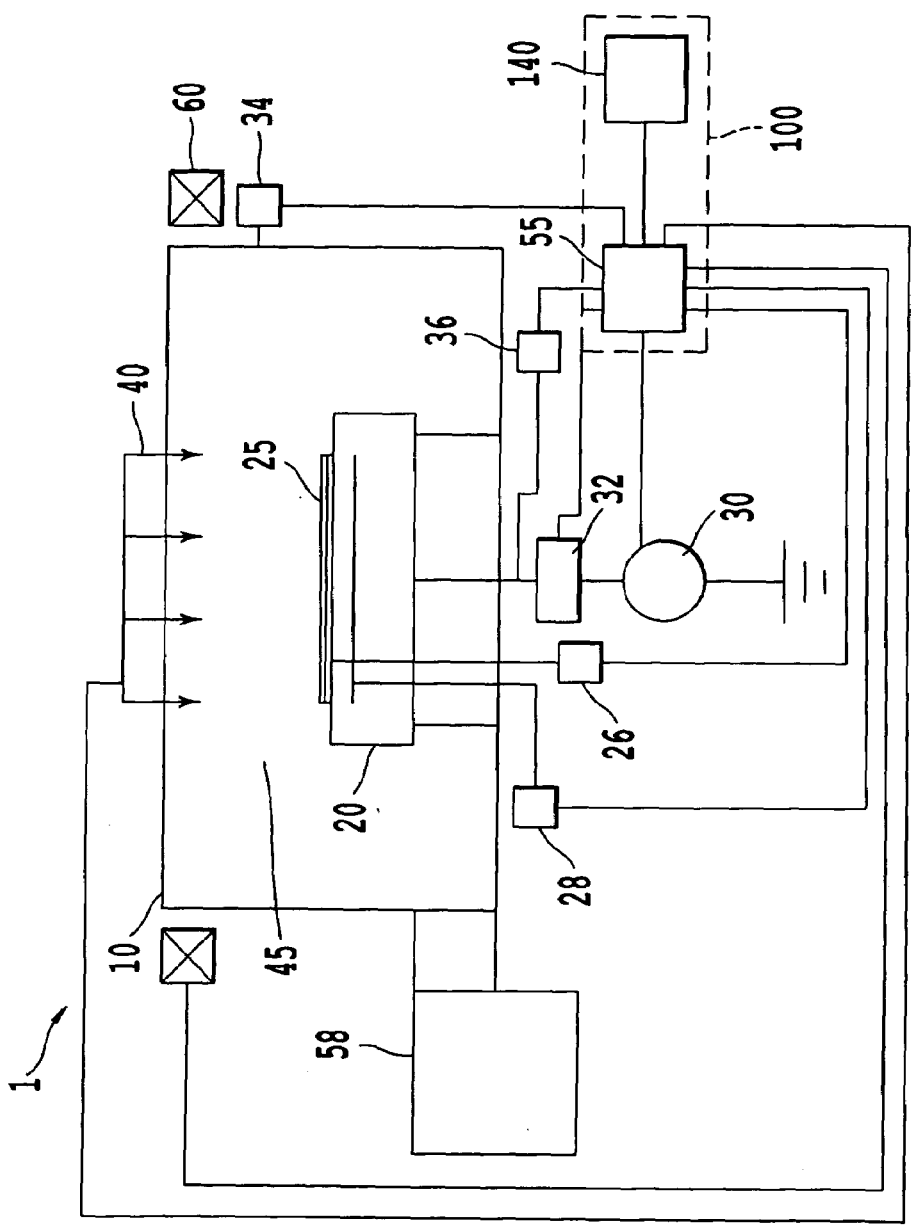
FIG. 3 shows a material processing system according to another embodiment of the present invention.

As shown in FIG. 3, material processing system 1 can include magnetic field system 60. For example, magnetic field system 60 can include a stationary or either a mechanically or electrically rotating DC magnetic field in order to potentially increase plasma density and/or improve material processing uniformity. Moreover, process performance controller 55 can be coupled to magnetic field system 60 in order to regulate the field strength or the speed of rotation.

Figure 4:
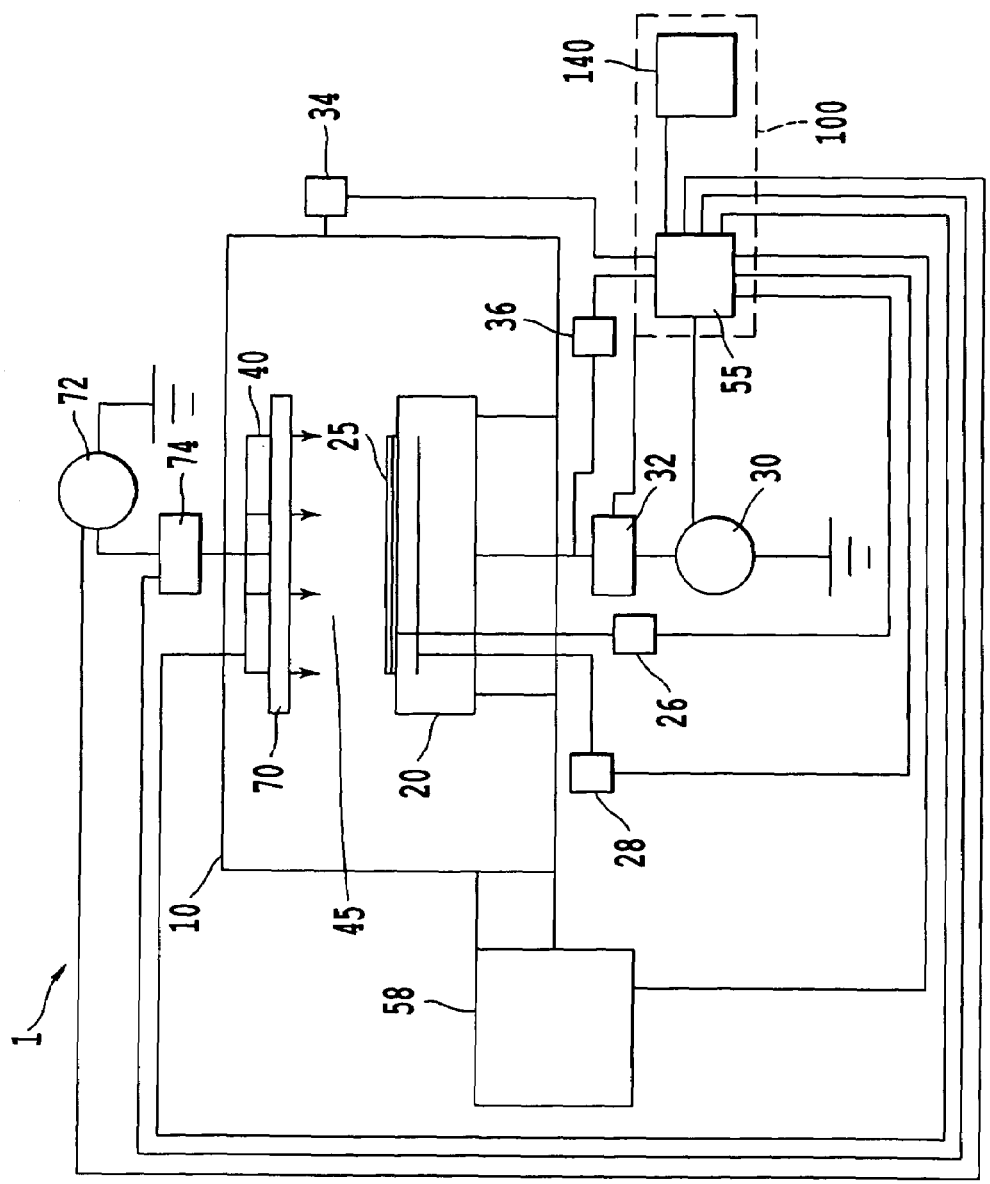
FIG. 4 shows a material processing system according to a further embodiment of the present invention.

As shown in FIG. 4, the material processing system of FIG. 1 can include an upper electrode 70. For example, RF power can be coupled from RF generator 72 through impedance match network 74 to upper electrode 70. A frequency for the application of RF power to the upper electrode preferably ranges from 10 MHz to 200 MHz and is preferably 60 MHz. Additionally, a frequency for the application of power to the lower electrode preferably ranges from 0.1 MHz to 30 MHz and is preferably 2 MHz. Moreover, process performance controller 55 can be coupled to RF generator 72 and impedance match network 74 in order to control the application of RF power to upper electrode 70. The design and implementation of an upper electrode is well known to those skilled in the art.

Figure 5:
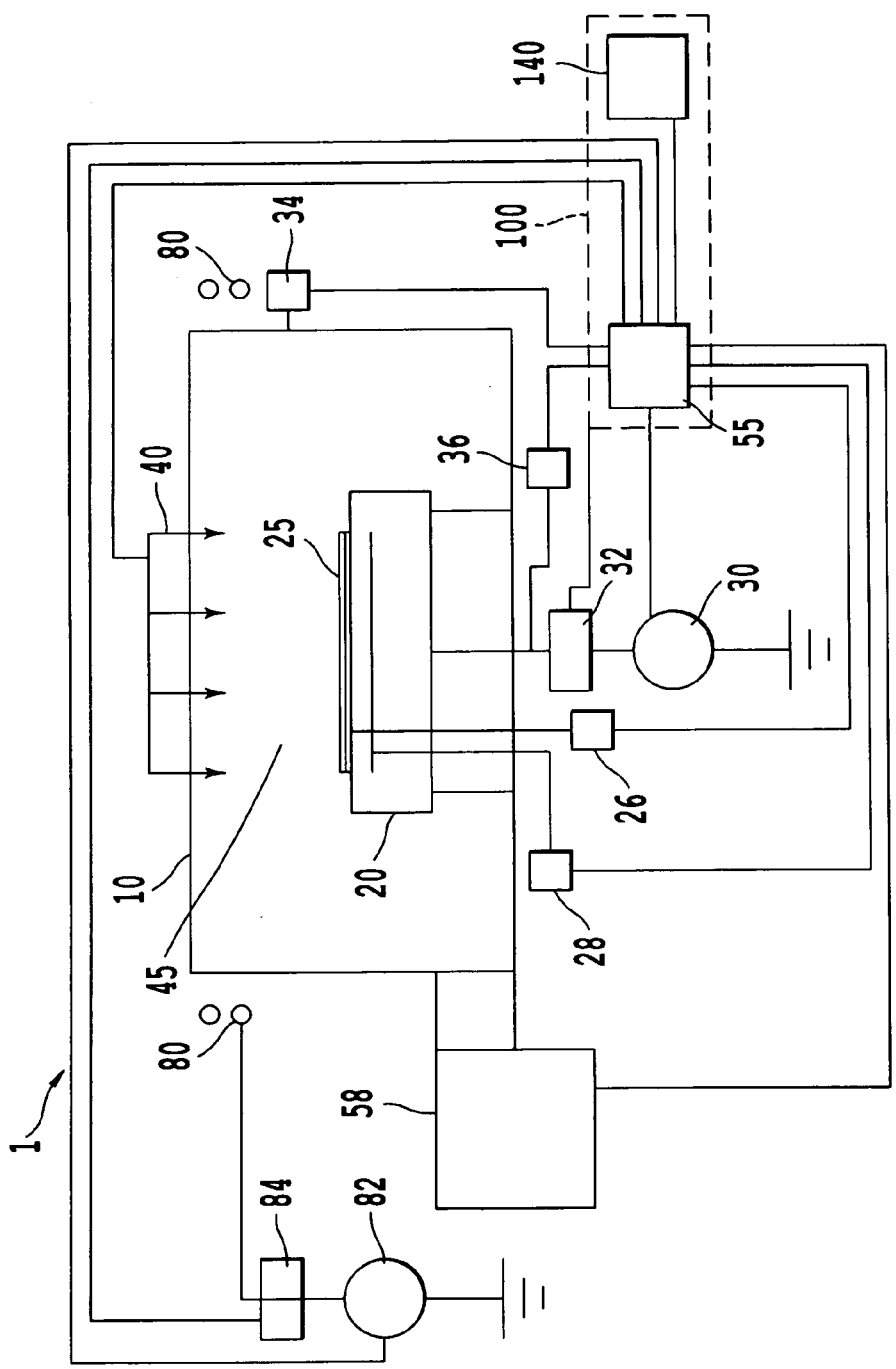
FIG. 5 shows a material processing system according to an additional embodiment of the present invention.

As shown in FIG. 5, the material processing system of FIG. 1 can include inductive coil 80. For example, RF power can be coupled from RF generator 82 through impedance match network 84 to inductive coil 80, and RF power can be inductively coupled from inductive coil 80 through dielectric window (not shown) to plasma processing region 45. A frequency for the application of RF power to the inductive coil 80 preferably ranges from 10 MHz to 100 MHz and is preferably 13.56 MHz. Similarly, a frequency for the application of power to the chuck electrode preferably ranges from 0.1 MHz to 30 MHz and is preferably 13.56 MHz. In addition, a slotted Faraday shield (not shown) can be employed to reduce capacitive coupling between the inductive coil 80 and plasma. Moreover, process performance controller 55 can be coupled to RF generator 82 and impedance match network 84 in order to control the application of power to inductive coil 80. In an alternate embodiment, inductive coil 80 can be a "spiral" coil or "pancake" coil in communication with the plasma processing region 45 from above as in a transformer coupled plasma (TCP) reactor.

Alternately, the plasma can be formed using electron cyclotron resonance (ECR). In yet another embodiment, the plasma is formed from the launching of a Helicon wave. In yet another embodiment, the plasma is formed from a propagating surface wave.

As discussed above, the process performance prediction model 100 establishes a relationship between tool data and process performance data and, therefore, it enables the prediction of process performance data for a given observation of tool data. The following describes the method of constructing the process performance prediction model 110.

Table 1 presents an exemplary set of tool data, to be correlated with process performance data, including sixty-one tool data parameters.

TABLE 1

Exemplary tool data.

| PARAMETER | DESCRIPTION | PARAMETER | DESCRIPTION |
| --- | --- | --- | --- |
| APC | Adaptive pressure control valve setting | RF_FORWARD-S | Forward RF power, Standard deviation |
| HE_C_PRESS | Helium backside pressure (center), Average | C2_POSITION | Capacitor no.2 position, Average |
| AR_FLOW | Argon gas flow rate, Average | ESC_CURRENT | Electrostatic clamp current, Average |
| PRESSURE | Chamber pressure, Average | LOWER_TEMP | LEL temperature Average |
| UPPER_TEMP | UEL temperature, Average | RF_REFLECT | Reflected RF power, Average |
| VIP_Z | Current-voltage probe impedance, Average | VIP_PHASE | Current-voltage probe phase, Average |
| HE_C_FLOW-S | Helium backside flow (center) Standard deviation | APC-S | Adaptive pressure control valve setting, Standard Deviation |
| ESC_VOLTAGE-S | Electrostatic clamp voltage, Standard deviation | HE_C_PRES-S | Helium backside pressure (center), Standard deviation |
| MAGNITUDE-S | Match network, control signal, magnitude, Standard deviation | AR_FLOW-S | Argon gas flow rate, Standard deviation |
| RF_VDC-S | DC voltage, RF system, Standard deviation | PRESSURE-S | Chamber pressure, Standard deviation |
| VIP_RF_ON-S | Current voltage probe on/off status, Standard deviation | UPPER_TEMP-S | UEL temperature, Standard deviation |
| C1_POSITION | Capacitor no. 1 position, Average | VIP_Z-S | Current-voltage probe impedance, Standard deviation |
| HE_E_PRES | Hellium backside pressure (edge) Average | HE_C FLOW | Helium backside flow (center), Average |
| C5F8_FLOW | C5F8 gas flow rate, Average | ESC_VOLTAGE | Electrostatic clamp voltage, Average |
| RF_FORWARD | Forward RF power, Average | MAGNITUDE | Match network control signal, magnitude, Average |
| VIP_I | Current-voltage probe current, Average | RF_VDC | DC voltage, RF system, Average |
| WALL_TEMP | Chamber wall temperature Average | VIP_RF_ON | Current voltage probe on/off status, Average |
| HE_E_FLOW-S | Helium backside flow (edge), Standard deviation | C1_POSITION-S | Capacitor no.1 position, Standard deviation |
| O2_FLOW-S | Oxygen gas flow rate, Standard deviation | HE_E_PRES-S | Helium backside pressure (edge), Standard deviation |

TABLE 1-continued

Exemplary tool data.

| PARAMETER | DESCRIPTION | PARAMETER | DESCRIPTION |
|---|---|---|---|
| PHASE-S | Match network, control signal, phase, Standard deviation | C5F8_FLOW-S | C5F8 gas flow rate, Standard deviation |
| RF_VPP-S | RF voltage peak-to-peak Standard deviation | VIP_I-S | Current-voltage probe current, Standard deviation |
| VIP_V-S | Current-voltage probe voltage Standard deviation | WALL_TEMP-S | Chamber wall temperature, Standard deviation |
| HE_E_FLOW | Helium backside flow (edge), Average | VIP_PHASE-S | Current-voltage probe phase, Standard deviation |
| O2_FLOW | Oxygen gas flow rate, Average | RF_HR | RF hours |
| PHASE | Match network control signal, phase, Average | SLOT_ID | Wafer slot Index |
| RF_VPP | RF voltage peak-to-peak, Average | RF_HRxFR_THK | RF hours (X) Focus ring thickness |
| VIP_V | Current-voltage probe voltage, Average | RF_HRxFR_RFHR | RF hours (X) Focus ring RF hours |
| C2_POSITION-S | Capacitor no. 2 position, Standard deviation | FR_THK | Focus ring thickness |
| ESC_CURRENT-S | Electrostatic clamp current, Standard deviation | FR_RFHR | Focus ring RF hours |
| LOWER_TEMP-S | LEL temperature, Standard deviation | FR_THKxFR_RFHF | Focus ring thickness (X) Focus ring RF hours |
| RF_REFLECT-S | Reflected RF power, Standard deviation | | |

Moreover, an exemplary set of process performance data pertaining to trench etching as part of a damascene process can include a mean trench etch depth and a trench etch depth range. The mean trench etch depth can, for example, include a spatial average of the trench etch depth at a plurality of locations on a substrate. The trench etch depth range can, for example, include a minimum-maximum range, a variance, a standard deviation, or a root mean square (rms) of the data scatter about the mean value for the etch depth.

The measurement of the trench etch depth and trench etch depth range can be performed directly using a scanning electron microscope (SEM) to view SEM micrographs from cleaved substrates, or indirectly using advanced, in-situ technology such as, for example, DUV spectroscopic ellipsometry (e.g., see "Specular spectroscopic scatterometry", *IEEE Transactions on Semiconductor Manufacturing*, Vol. 14, No. 2, May 2001, which is incorporated herein by reference in its entirety). A commercially available product featuring optical digital profilometry (ODP) is that sold and distributed by Timbre Technologies, Inc., A TEL Company (5341 Randall Place, Fremont, Calif. 94538) coupled with the hardware from Therma-Wave, Inc. (1250 Reliance Way, Fremont, Calif. 94539).

Each set of data, including both tool data and corresponding process performance data, includes an observation set, where either a single observation can be made per substrate or a plurality of observations can be performed per substrate. Each observation in an observation set, including both tool data and process performance data, can include an $n^{th}$ order statistic (e.g., time average, rms of time trace, skewness of time trace, etc.). For example, each observation set can correspond to a substrate processed, wherein each tool data parameter is sampled during the length of the process, trimmed (i.e., data at the start and end of the sampled data is trimmed to remove start/end transients), and averaged.

Given a plurality of observations sets, a relationship can be determined between the tool data in the plurality of observation sets and the process performance data in the plurality of observation sets using multivariate analysis (MVA). One exemplary MVA technique for determining such a relationship is partial least squares (PLS) modeling.

Using PLS, observation sets of tool data are received from a plurality of sensors. For each observation set, tool data can be stored as a row in a matrix $\overline{X}$ and process performance data can be stored as a row in matrix $\overline{Y}$. Hence, once the matrix $\overline{X}$ is assembled, each row represents a different observation and each column represents a different tool data parameter (from Table 1), and, once the matrix $\overline{Y}$ is assembled, each row represents a different observation and each column represents a different process performance parameter. Hence, using the set of parameters in Table 1, matrix $\overline{X}$ is a rectangular matrix of dimensions M by sixty-one, where M is the number of observation sets. Similarly, matrix $\overline{Y}$ is a rectangular matrix of dimensions M by 2. More generally, matrix $\overline{X}$ can be an m by n matrix, and matrix $\overline{Y}$ can be an m by p matrix. Once all of the data is stored in the matrices, the data can be mean-centered and/or normalized, if desired. The process of mean-centering the data stored in a matrix column involves computing a mean value of the column elements and subtracting the mean value from each element. Moreover, the data residing in a column of the matrix can be normalized by the standard deviation of the data in the column.

In the following discussion, a set of tool data and process performance data is utilized from forty-five substrates in order to present the method by which tool data are optimized and a model is established for relating the tool data and the process performance data (i.e., M=45 in the above discussion.) The forty-five process runs (substrates) includes three sets of substrates processed in an etch chamber, where each set of substrates is preceded by a chamber wet clean. The tool data included in the PLS analysis model is listed in Table 1 and the process performance data includes the mean trench etch depth and the trench etch depth range.

In the PLS analysis, a set of loading (or correlation) coefficients can be defined which relate the tool data ($\overline{X}$) to the process performance data ($\overline{Y}$). In general, for multivariate analysis, the relationship between the tool data and the process performance data can be expressed as follows:

$$\overline{X}\overline{B}=\overline{Y}, \tag{1}$$

where $\overline{X}$ represents the m by n matrix described above, $\overline{B}$ represents an n by p (p<n) loading (or correlation) matrix and $\overline{Y}$ represents the m by p matrix described above.

Once the data matrices $\overline{X}$ and $\overline{Y}$ are assembled, a relationship designed to best approximate the $\overline{X}$ and $\overline{Y}$ spaces and to maximize the correlation between $\overline{X}$ and $\overline{Y}$ is established using PLS analysis.

In the PLS analysis model, the matrices $\overline{X}$ and $\overline{Y}$ are decomposed as follows:

$$\overline{X}=\overline{T}\overline{P}^T+\overline{E}; \tag{2a}$$

$$\overline{Y}=\overline{U}\overline{C}^T+\overline{F}; \tag{2b}$$

and $$\overline{U}=\overline{T}+\overline{H}; \tag{2c}$$

where $\overline{T}$ is a matrix of scores that summarizes the $\overline{X}$ variables, $\overline{P}$ is a matrix of loadings for matrix $\overline{X}$, $\overline{U}$ is a matrix of scores that summarizes the $\overline{Y}$ variables, $\overline{C}$ is a matrix of weights expressing the correlation between $\overline{Y}$ and $\overline{T}$ ($\overline{X}$), and $\overline{E}$, $\overline{F}$ and $\overline{H}$ are ma residuals. Furthermore, in the PLS analysis model, there are additional loadings $\overline{W}$ called weights that correlate $\overline{U}$ and $\overline{X}$, and are used to calculate $\overline{T}$. In summary, the PLS analysis geometrically corresponds to fitting a line, plane or hyper plane to both the $\overline{X}$ and $\overline{Y}$ data represented as points in a multidimensional space, with the objective of well approximating the original data tables $\overline{X}$ and $\overline{Y}$, and maximizing the covariance between the observation positions on the hyper planes.

Figure 6:
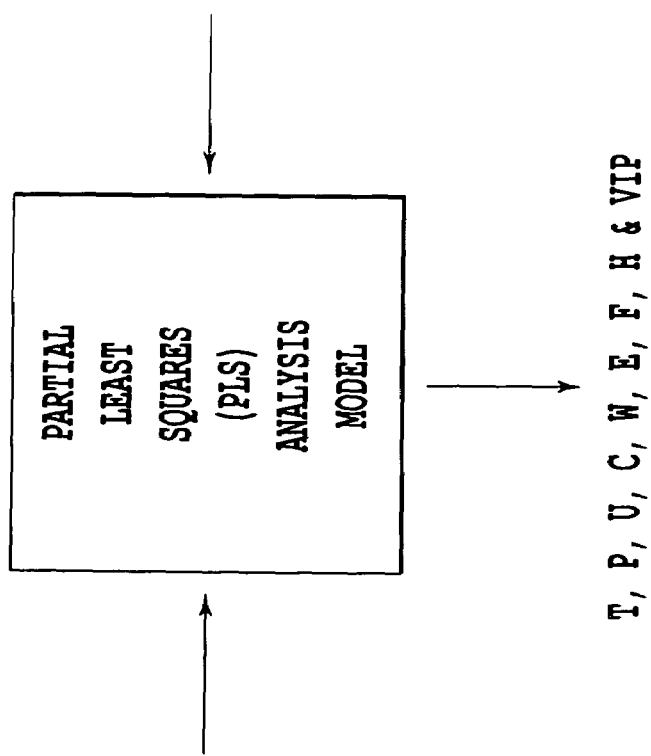
FIG. 6 presents a schematic representation of some of the inputs and outputs for a partial least squares (PLS) analysis model.

FIG. 6 provides a schematic representation of the data inputs, $\overline{X}$ and $\overline{Y}$, to the PLS analysis and the corresponding outputs $\overline{T}$, $\overline{P}$, $\overline{U}$, $\overline{C}$, $\overline{W}$, $\overline{W}$, $\overline{F}$, $\overline{H}$ and variable importance in the projection (VIP). An example of a commercially available software which supports PLS analysis modeling is SIMCA-P 8.0. For further details on this software see the User's Manual (User Guide to SIMCA-P 8.0: A new standard in multivariate, data analysis, Umetrics AB, Version 8.0, September 1999).

In general, SIMCA-P outputs other important information regarding the descriptive power of the model (i.e., the quality of the correlation obtained between $\overline{X}$ and $\overline{Y}$), and the predictive power of the model. For example, SIMCA-P iteratively computes one PLS component at a time, that is one vector each of X-scores $\overline{T}$, Y-scores $\overline{U}$, weights $\overline{W}$ and $\overline{C}$, and loadings $\overline{P}$. The PLS components are calculated in descending order of importance. After each PLS component, SIMCA-P can display the following: the fraction of the sum of squares (SS) of all Y's and X's explained by the current component ($R^2X$, $R^2Y$); the fraction of variance of all the Y's and X's explained by the current component $R^2Xadj$, $R^2Yadj$); the cumulative SS of all the Y's and X's explained by all extracted components ($R^2X$(cum), $R^2Y$(cum)); and the cumulative variance of all the Y's and X's explained by all extracted components ($R^2Xadj$(cum), $R^2Yadj$(cum)).

Figure 7:
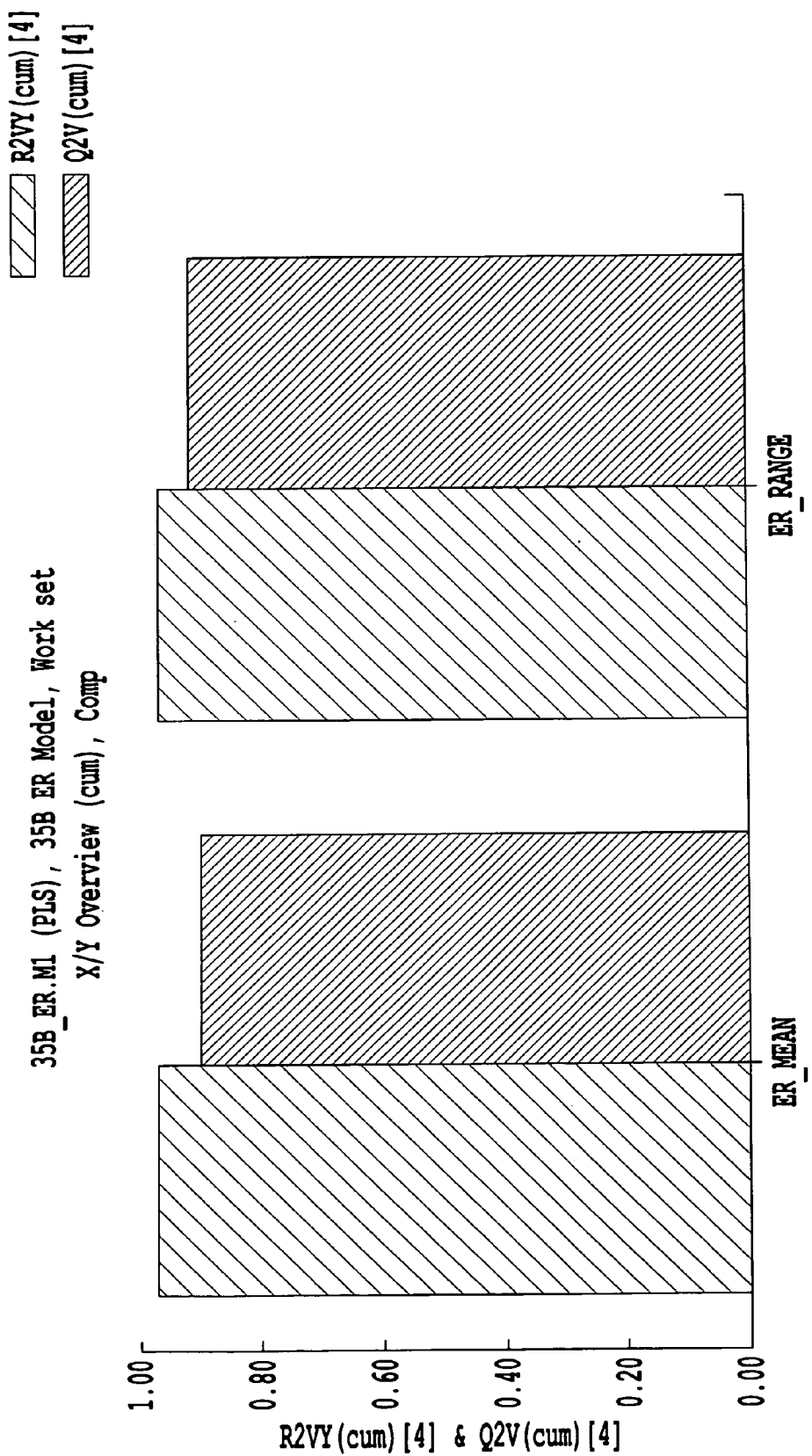
FIG. 7 presents an exemplary output of statistics from a PLS analysis model.

Furthermore, for every active variable, the fraction of SS ($R^2V$) or variance ($R^2Vadj$) explained can be displayed. This value is computed for the current component as well as cumulatively for all PLS components. For response variables $\overline{Y}$, this value corresponds to $R^2$ (the multiple correlation coefficient), the "goodness" of the fit. For example, utilizing the data above, FIG. 7 presents this value for $\overline{Y}$ ($R^2VY$(cum)) for each process performance parameter, namely, the mean etch depth and the etch depth range. By inspection of FIG. 7, the "goodness" of each fit exceeds ninety-seven percent when using the first four PLS components.

In general, additional criterion used to determine the model dimensionality (number of significant PLS components), is cross validation. With cross validation, observations are kept out of the model development, then the response values ($\overline{Y}$) for the kept out observations are predicted by the model, and compared with the actual values. This procedure is repeated several times until every observation has been kept out once and only once. The prediction error sum of squares (PRESS) is the squared differences between observed $\overline{Y}$ and predicted values when the observations were kept out. For every dimension, the overall PRESS/SS is computed, where SS is the residual sum of squares of the previous dimension, and also (PRESS/SS)$_m$ for each $\overline{Y}$ variable (m). These values are good measures of the predictive power of the model. For example, SIMCA-P can present this information as follows: the fraction of the total variation of the Y's that can be predicted by a component ($Q^2$=(1.0-PRESS/SS)); the fraction of the variation of a variable $Y_m$ that can be predicted by a component ($Q^2V$=(1.0-PRESS/SS)$_m$); the cumulative $Q^2$ for the extracted components ($Q^2_{cum}$=II (1.0-PRESS/SS)$_a$); and the cumulative $Q^2V$ of a variable ($Q^2V_{cum}$=II (1.0-PRESS/SS)$_{ka}$). FIG. 7 further presents the predictive power ($Q^2V_{cum}$) for each process performance parameter, namely, the mean etch depth and the etch depth range. By inspection of FIG. 7, the predictive power of each fit exceeds ninety-one percent when using the first four PLS components.

Figure 8:
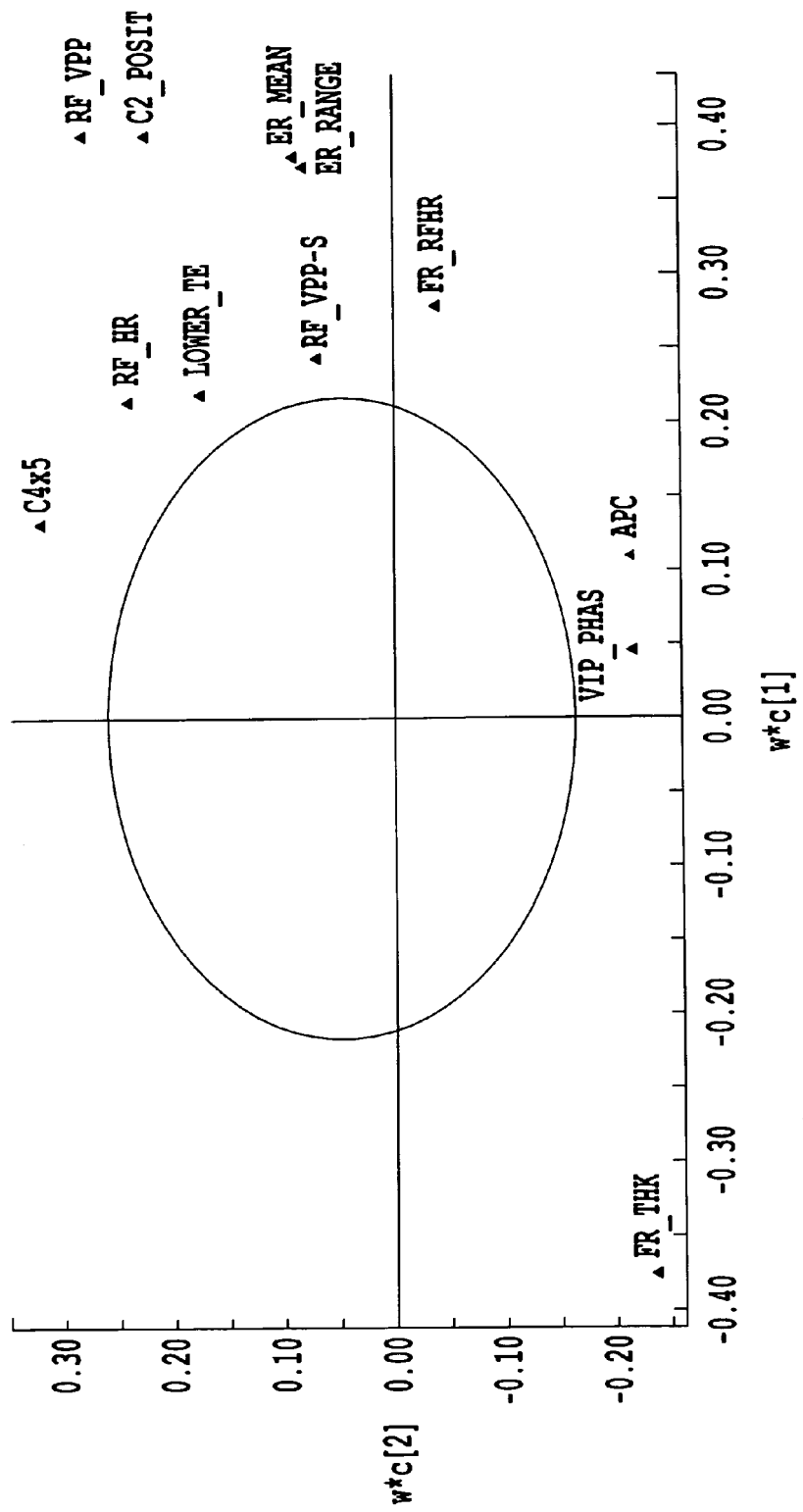
FIG. 8 presents an exemplary graph of work set loadings w*c(1) versus w*c(2)

FIG. 8 presents the work set loadings, w*c(1) versus w*c(2), for the tool data and process performance data described above. The plot shows both the X-weights (w or w*) and Y-weights (c), and thereby the correlation structure between $\overline{X}$ and $\overline{Y}$. In addition, FIG. 8 shows how the $\overline{X}$ and $\overline{Y}$ variables combine in the projections, and how the $\overline{X}$ variables relate to the $\overline{Y}$ variables. For instance, two regions (upper right hand corner and lower left hand corner) indicate where a "strong" correlation exists between the tool data parameters and the process performance parameters. Several tool data parameters from Table 1 are shown in FIG. 8 as examples of how tool data parameters are correlated to process performance. The oval in FIG. 8 defines a region where the remaining tool data parameters of Table 1 are grouped around the center point of the plot indicating that the parameters are not closely correlated to process performance.

Figure 9:
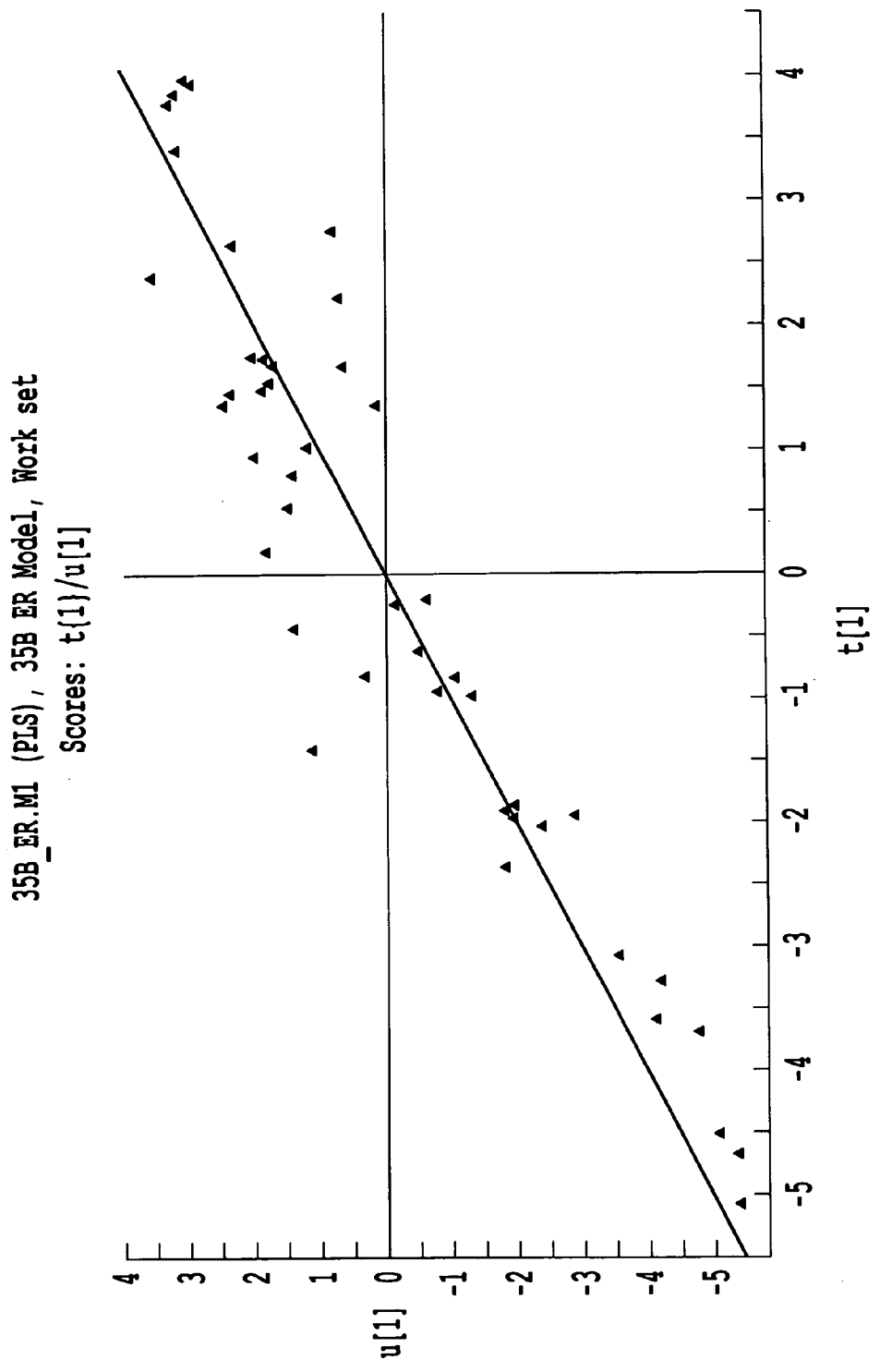
FIG. 9 presents an exemplary graph of work set scores t(1) versus u(1)

FIG. 9 presents the work set scores, t(1) versus u(1) for the 45 substrates. This plot displays the objects in the projected X(T) and Y(U) space, and shows how well the Y space coordinate (u) correlates with the X space coordinate (t).

Figure 10:
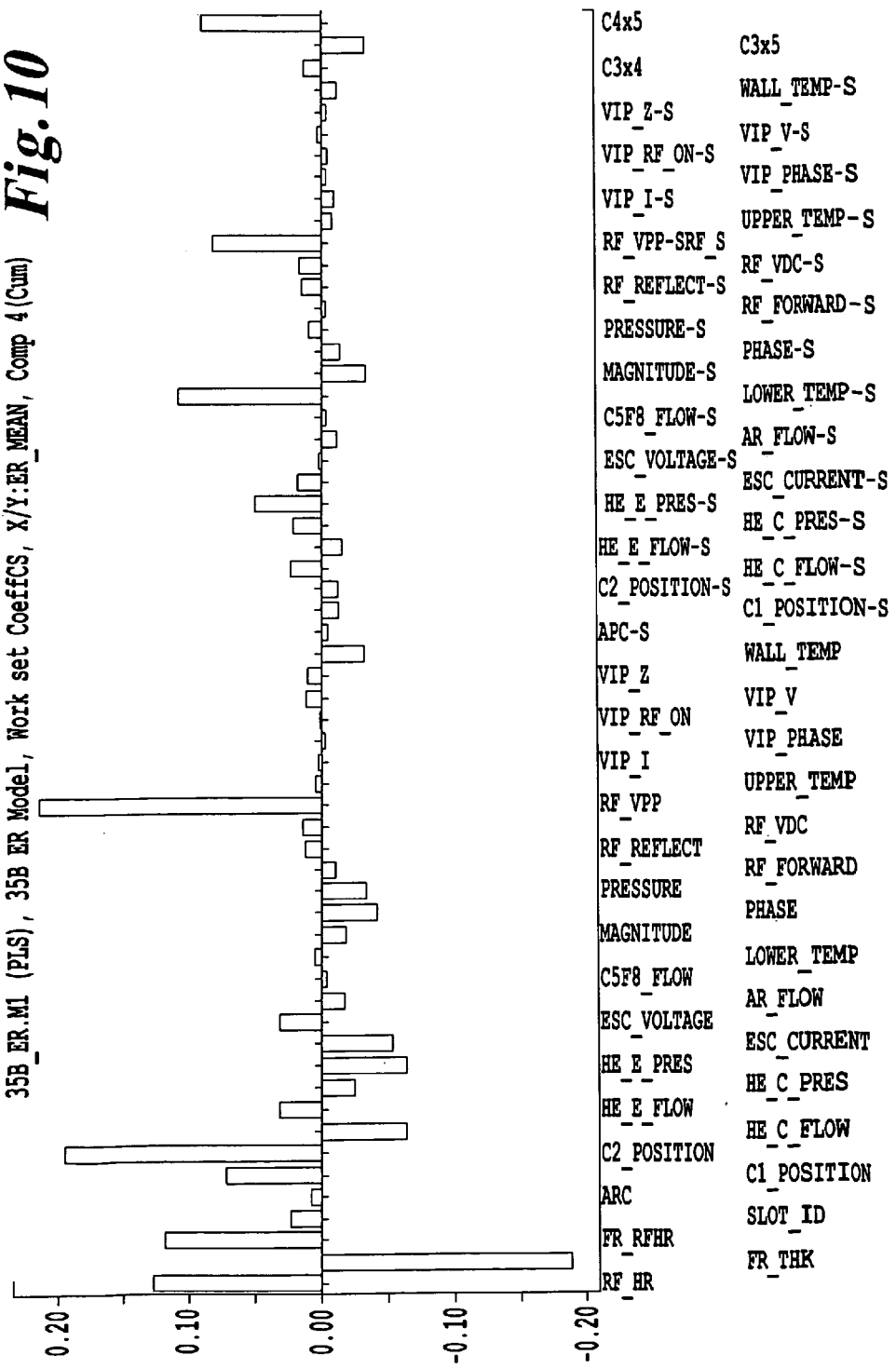
FIG. 10 presents an exemplary set of coefficients for a mean trench etch depth model.
Figure 11:
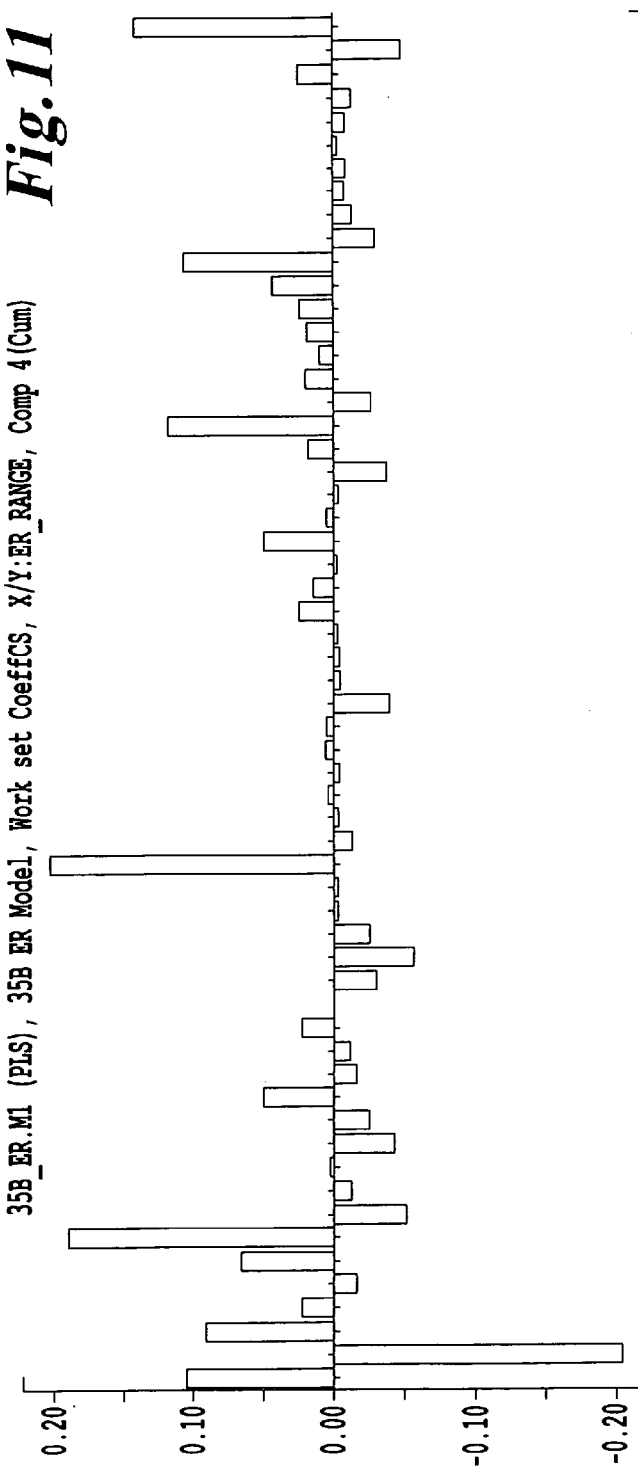
FIG. 11 presents an exemplary set of coefficients for a trench etch depth range model.

FIGS. 10 and 11 present the coefficients assigned to each tool data parameter for the mean etch depth model and the etch depth range model, respectively.

Once the PLS analysis is complete and the above output matrices have been computed, the influence on the $\overline{Y}$ matrix of every term or column in the $\overline{X}$ matrix, namely, the VIP is determined. VIP is the sum over all model dimensions of the contributions variable influence (VIN). For a given PLS dimension, (VIN)$_{ij}^2$ is related to the squared PLS weight (w$^{ij}$)$^2$ of that term. The accumulated (over all PLS dimensions) value, $$VIP_j = \sum_i (VIN)_j^2, \qquad (3)$$

is used for further analysis. Once the VIPs are computed for each variable in matrix $\overline{X}$, they may be sorted and plotted in descending order against the variable number. Those variables with the largest VIP will have the greatest impact on the process performance data in matrix $\overline{Y}$.

Figure 12:
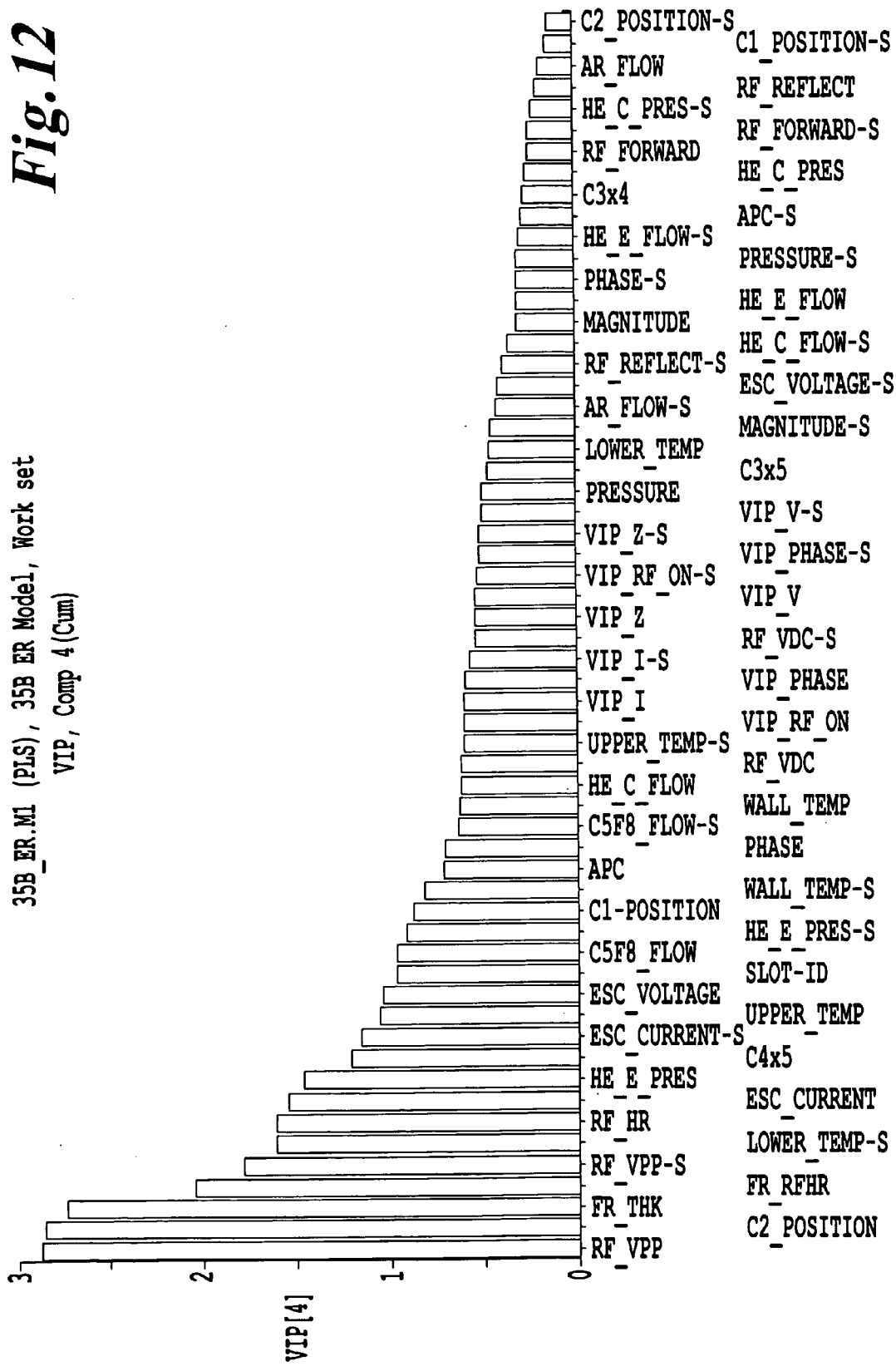
FIG. 12 presents an exemplary distribution for a set of variable importance in the projection (VIP) data.

For example, FIG. 12 shows the VIP (for a four PLS component model) in monotonically descending order (i.e., the tool data parameters falling on the left hand side of the plot are the most significant parameters in the model).

Figure 13:
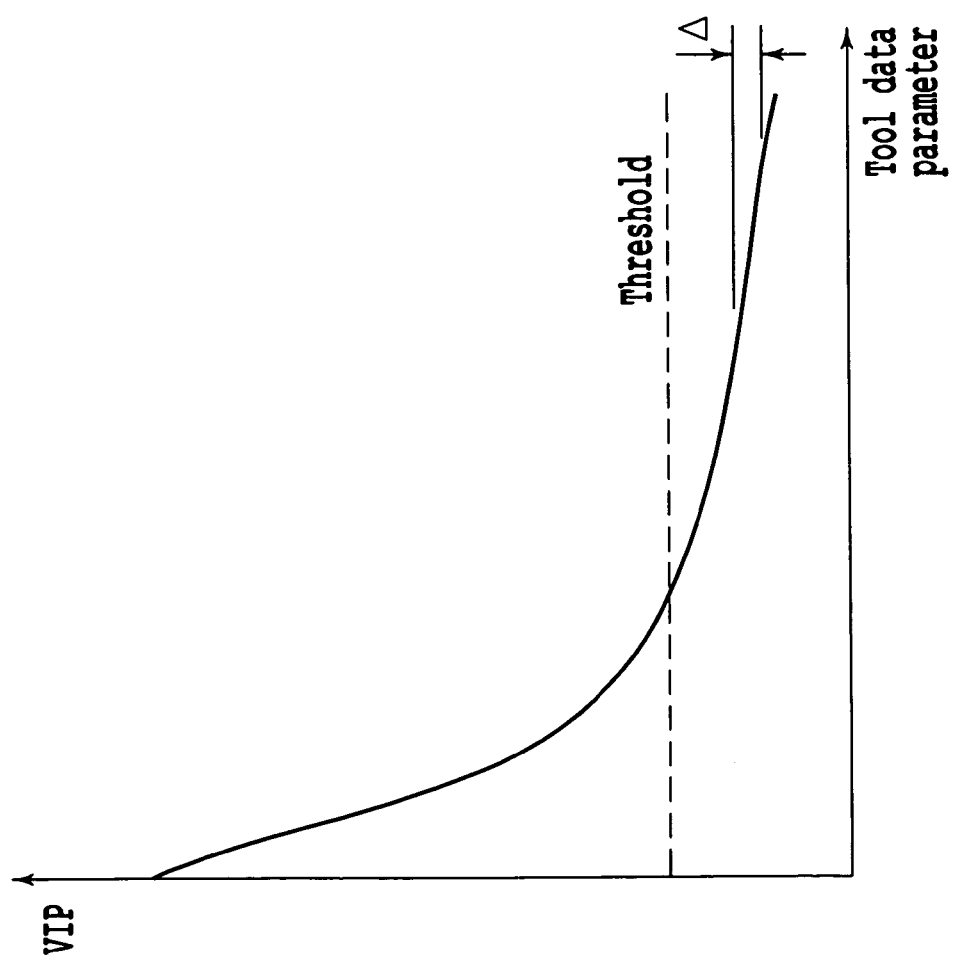
FIG. 13 shows exemplary criteria for refining the tool data using VIP data.

Using the VIP data of FIG. 12, the relative significance of a given tool data parameter on the process performance data $\overline{Y}$ can be assessed, and thereby the data matrix $\overline{X}$ can be refined by reducing the variable dimension n of the original data matrix $\overline{X}$. Exemplary criterion used to discard the variables of minimal impact or little significance to the process performance data include: (1) discard those variables whose VIP falls less than a pre-specified threshold (see FIG. 13); (2) discard those variables associated with VIPs in the lowest 10$^{th}$ percentile or within some other predetermined range (or, in other words, retain those variables associated with the largest VIP in the top $90^{th}$ percentile, however, note that the percentile threshold or range selected can be different from the 90/10 embodiment described herein); and (3) the first, second or higher derivative of the VIP with respect to the variable number may be used to select a value for the VIP, below which or above which those variables are discarded (i.e., a maximum in the first or second derivative, or when the first derivative becomes less than a predetermined threshold slope).

Using any one of the above-mentioned criteria, those variables that have minimal impact on the process performance data can be discarded. This data reduction or refinement, in turn, reduces the column space of the data matrix $\overline{X}$ from p (sixty-one in the above example) to q (e.g., <sixty-one parameters), and forms a "new", reduced or refined data matrix $\overline{X}^*$ of dimensions m by q (forty-five by<sixty-one). Once an initial data reduction has taken place, those tool data parameters important for establishing a "good" model between the tool data and the process performance data can be stored. Thereafter, further refinement or reduction of the data matrix $\overline{X}^*$ can be performed and/or the method can proceed with re-computing the output matrices from the PLS analysis model using the reduced data matrix $\overline{X}^*$ and determining the correlation matrix $\overline{B}$ for establishing the relationship between the tool data and the process performance data.

At this point, the PLS model is repeated following the schematic presented in FIG. 6, except now the reduced matrix $\overline{X}^*$ is used as the input to the PLS analysis. The output matrices are then recomputed. As stated above, the VIPs can be studied following the description associated with FIG. 13 to further refine the data matrix $\overline{X}^*$, or the correlation matrix $\overline{B}$ may be evaluated from the output data using the following relationship:

$$\overline{B}=\overline{W}(\overline{P}^T\overline{W})^{-1}\overline{C}^T. \quad (4)$$

Once the data matrix $\overline{X}^*$ has been optimized, a final pass through the PLS analysis is generally required to update or re-compute the output matrices necessary for computing the correlation matrix $\overline{B}$. Hereinafter, the evaluation of equation (4) leads to a set of correlation coefficients to be used for extracting the predicted process performance data from the sampled tool data.

Figure 14:
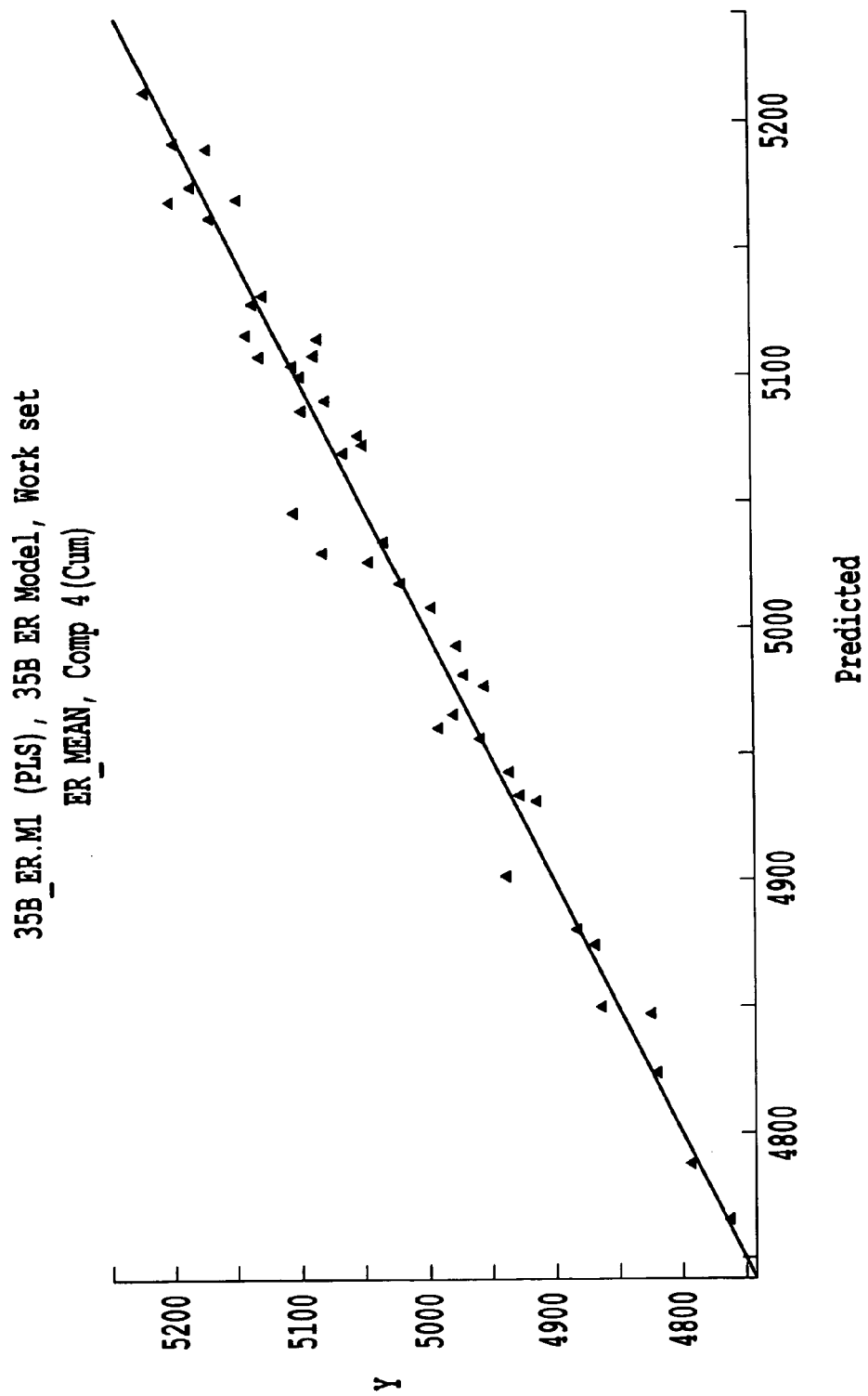
FIG. 14 presents an exemplary comparison between the observed mean trench etch depth and the predicted mean trench etch depth.
Figure 15:
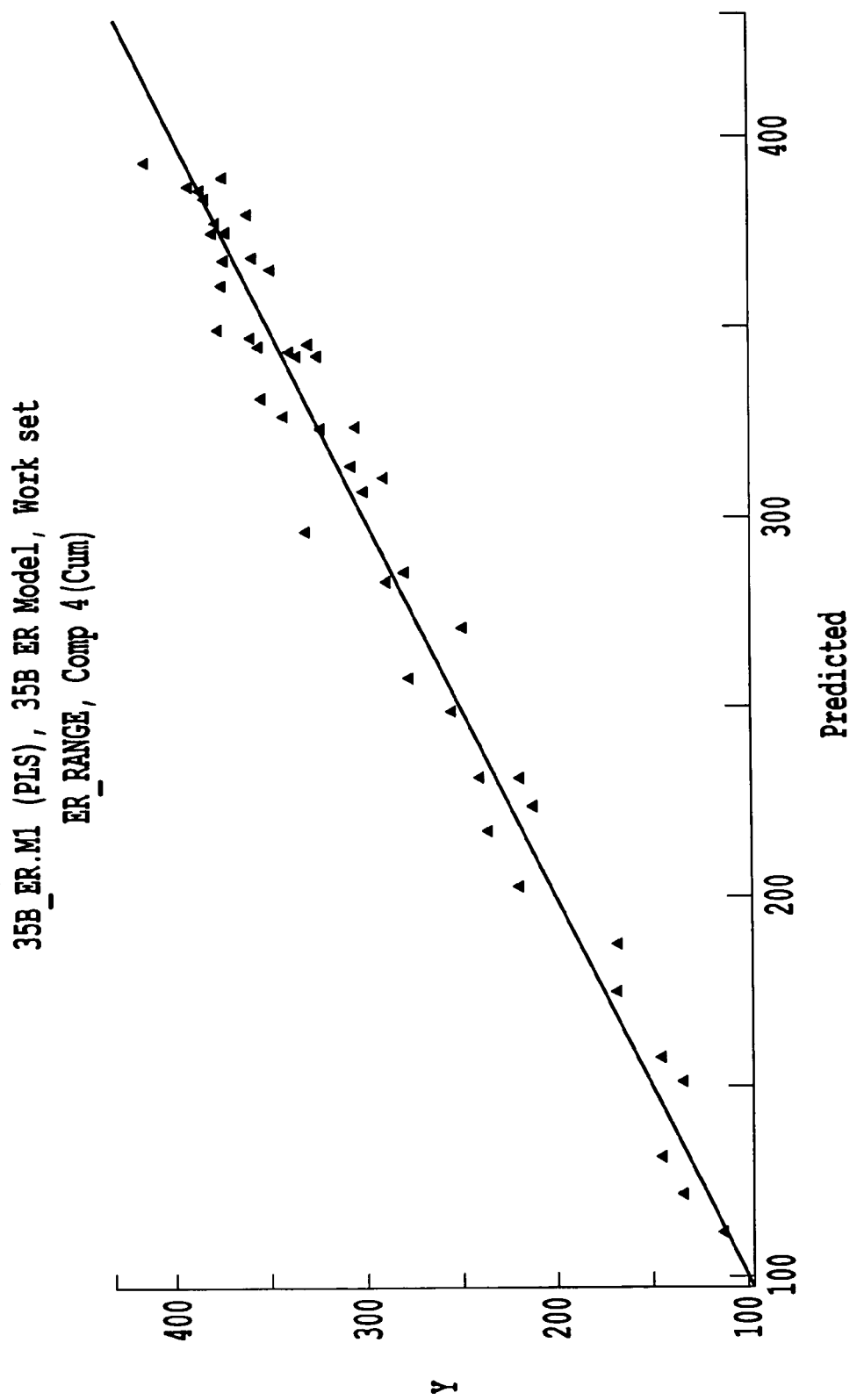
FIG. 15 presents an exemplary comparison between the observed trench etch depth range and the predicted trench etch depth range.

FIG. 14 presents the measured mean trench etch depth for the 45 substrates versus the predicted mean trench etch depth, and FIG. 15 presents the measured trench etch depth range for the 45 substrates versus the predicted trench etch depth range. A slope of unity indicates a good agreement between the measured and predicted values.

Figure 16:
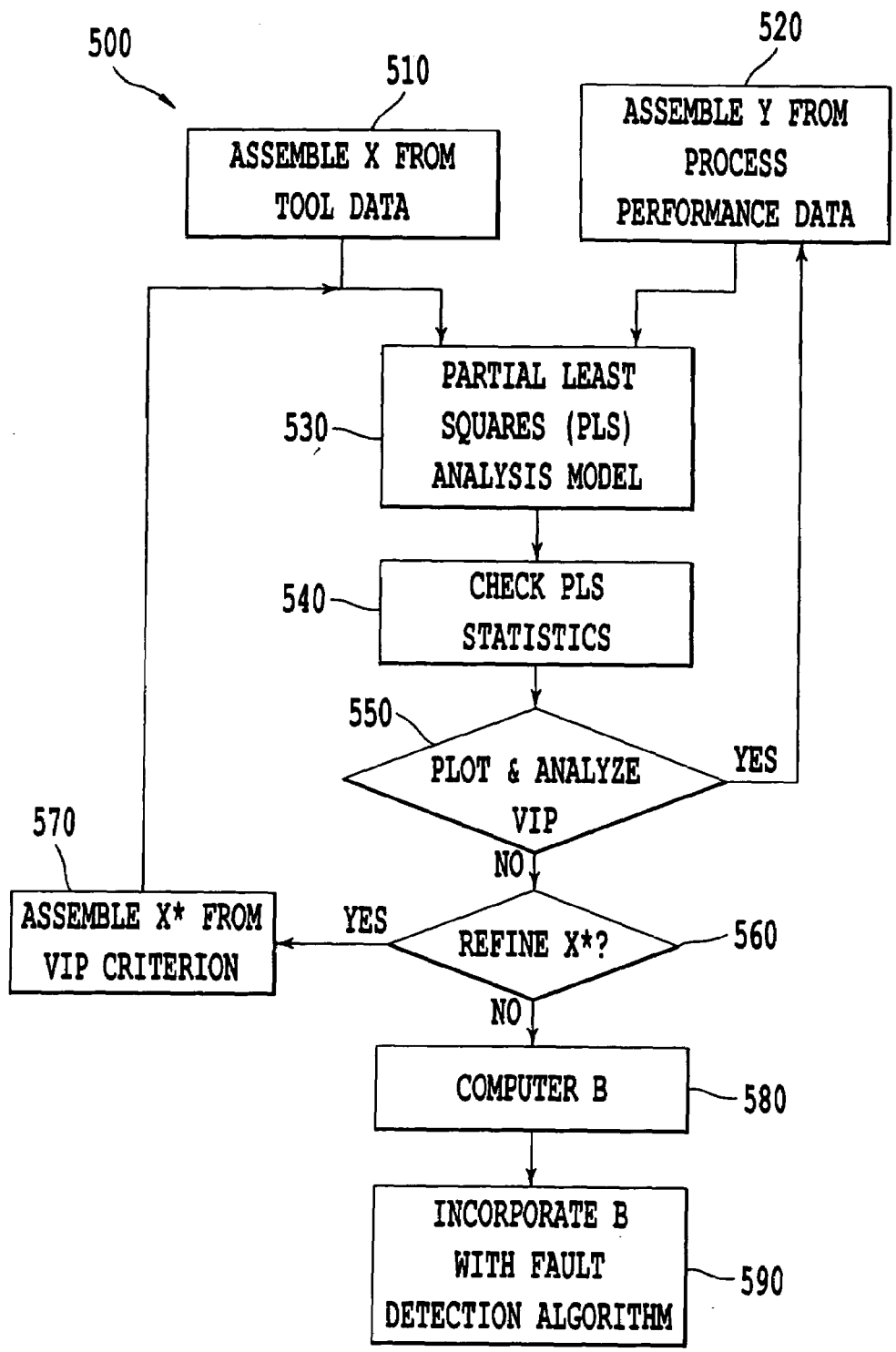
FIG. 16 presents a flow diagram of a method of constructing a process performance prediction model according to an embodiment of the present invention.

Using FIG. 16, a method for constructing a process performance prediction model is described. Procedure 550 begins with step 510 where the matrix $\overline{X}$ is assembled from the observed tool data. As described above, each column represents a different tool data parameter and each row represents an observation. Similarly, in step 520, the matrix $\overline{Y}$ is assembled using observed process performance data. Again, each column represents a different process performance data parameter and each row represents an observation. In step 530, matrices $\overline{X}$ and $\overline{Y}$ are input into the PLS analysis model to compute the above described output data (e.g., loading data, weighting data, scores data, VIP data, etc.; see FIGS. 6 through 12). In step 540, the PLS output statistics are checked to determine if the PLS fitting power and/or predictive power are acceptable. In step 550, the VIP data are plotted and analyzed in descending order as in FIG. 12. Using the data in step 550 from the PLS analysis, a decision whether to refine the matrix $\overline{X}$ is performed in step 560. If refinement (i.e., reduction of the number of tool data parameters to only significant tool data parameters) is required, then the procedure repeats the PLS analysis following step 570 with the new data matrix $\overline{X}^*$ in order to re-compute the corresponding new weighting, loading, variable influence, and score matrices. In step 570, the criterion described in association with the VIP information presented in FIG. 12 are utilized to reduce the matrix $\overline{X}$ to a new matrix $\overline{X}^*$, where the reduced matrix has discarded those variables (columns) deemed unimportant for the process performance data (e.g., there is a weak correlation or minimal impact between the tool data parameter and the process performance data). Once step 560 determines that matrix $\overline{X}^*$ is finalized, step 580 is performed. Step 580 includes computing the correlation matrix $\overline{B}$ from equation (4) for later use as a process performance prediction model. In step 590, the process performance prediction model is incorporated with, for example, a fault detection algorithm.

Once the correlation matrix $\overline{B}$ has been evaluated (or the process performance prediction model formulated), the correlation matrix $\overline{B}$ can be used as part of a fault detection algorithm to provide robust determination and prediction of process faults. The fault detection algorithm can, in general, be applied to a variety of processes, however, the specific correlation matrix $\overline{B}$ developed as described above will be specific to a particular process in a specific process tool. For example, silicon processing, such as etching, can be performed in a process tool much like that depicted in FIGS. 1 through 5.

Figure 17:
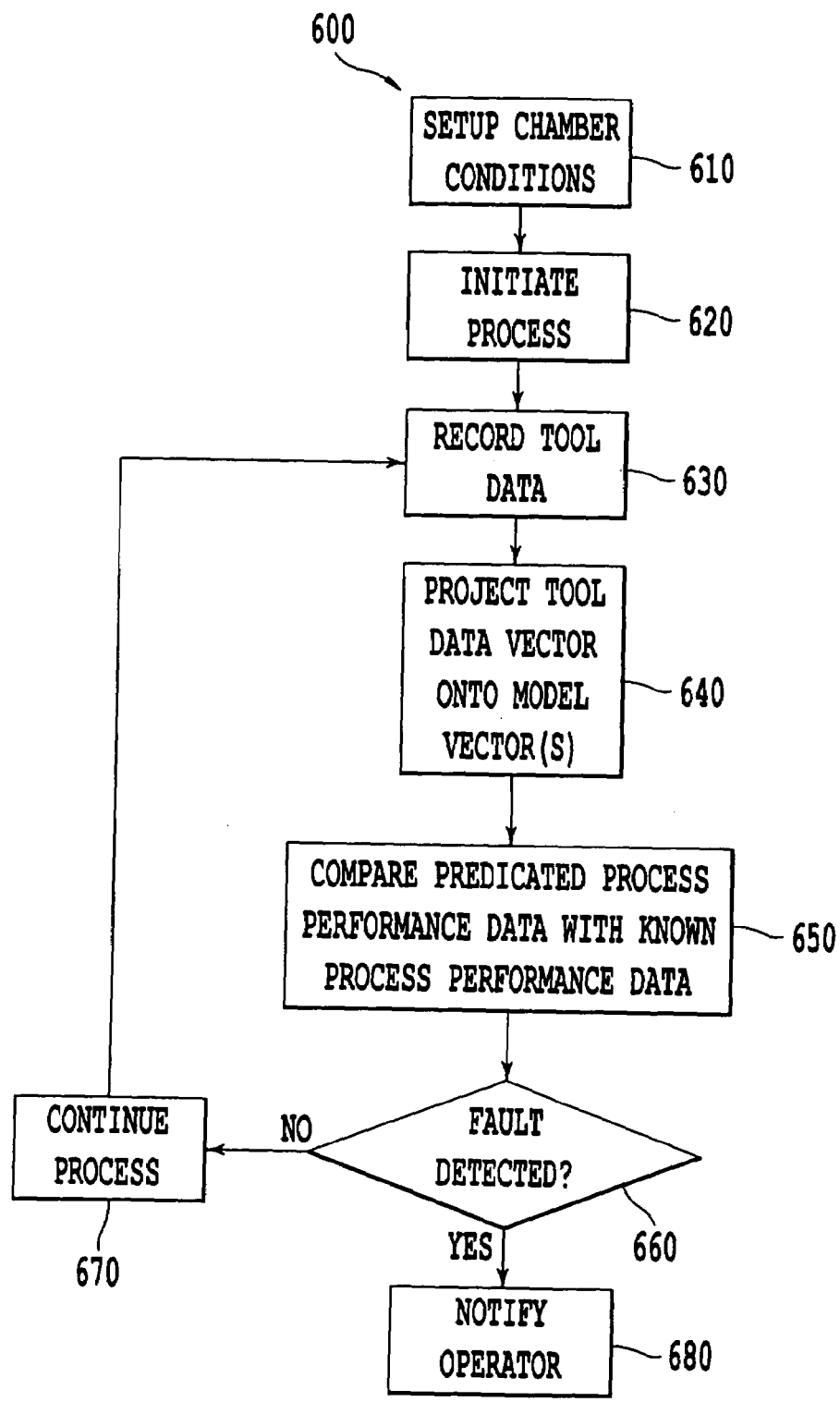
FIG. 17 presents a flow diagram of a method of fault detection using a process performance prediction model according to an embodiment of the present invention.

FIG. 17 presents a method of detecting a fault condition for a material processing system employing a process performance prediction model according to an embodiment of the present invention. The method includes a procedure 600 beginning with step 610 by preparing the chamber conditions for the specific process. For example, the chamber setup includes loading the substrate to be processed, pumping down the vacuum chamber to a base pressure, initiating the flow of process gas, and adjusting the vacuum pump throttle valve to establish the chamber process pressure. In step 620, the plasma is ignited via, for example, the application of RF power to an electrode as discussed with reference to FIGS. 2 through 5, thereby initiating the process. In step 630, an observation of tool data is recorded. In step 640, the established process performance prediction model is used with the observed tool data to predict the process performance data, which includes projecting the recorded tool data onto the one or more correlation data (process performance prediction model) via, for example, vector multiplication (or matrix multiplication). In step 650, the predicted process performance data are compared with target process performance data. The comparison can include forming difference data from a numerical difference, the square of a numerical difference, etc. In step 660, the difference data is compared with threshold difference data, where a fault is detected and/or predicted for the process when the difference data exceeds the threshold difference data and, conversely, the process is operating within an acceptable range when the difference data does not exceed the threshold difference data. If the process is operating within an acceptable range, then the process can continue in step 670. If a fault is detected or predicted, then an operator can be notified in step 680.

In the preceding text, methods of constructing a process performance prediction model 110 and applying the model for fault detection have been described. Using the example from above, the detection of a fault can subsequently be associated with either a fault in the mean trench etch depth or the trench etch depth range (i.e., one of process rate and/or process uniformity).

For example, the occurrence of a fault in mean trench etch depth can arise due to perturbations to the process tool performance (e.g., process drifts, etc.), sensor noise, drift in sensor calibration, etc. There exist a number of variables that are introduced from run-to-run, which can cause variations in process performance. However, with the formulation of a process performance prediction model 110, a prediction of process performance data, using an observation of tool data from a prior run, can be employed to update a process recipe in order to correct for process perturbations.

As described earlier, an element of the process recipe for (damascene structure) trench etch is the trench etch time which requires knowledge of the trench etch rate. According to one embodiment of the present invention, the process performance prediction model 110 can be utilized to predict a mean trench etch depth from an observation of tool data. Dividing the predicted mean trench etch depth $d_{predicted}$ by the etch time $\tau_{old}$ during the prior run produces the predicted mean trench etch rate $\epsilon_{predicted}$ (i.e., $\epsilon_{predicted}=d_{predicted}/\epsilon_{old}$).

Following the prediction of the mean trench etch rate using the process performance prediction model 110 and the known etch time for the prior run, a corrected etch time can be determined using the process recipe correction filter 120. The process recipe correction filter 120 can include an exponentially weighted moving average (EWMA) filter to correct the etch time in the process recipe using the old value for the etch time, the predicted value for the etch time and a filter constant, viz.

$$\tau_{new}=(1-\lambda)\tau_{old}+\lambda(\tau_{predicted}-\tau_{old}), \quad (5)$$

where $\lambda$ is the EWMA filter coefficient ($0 \leq \lambda \leq 1$), $\tau_{old}$ is the (old) process recipe etch time for the prior run, $\tau_{predicted}$ is the predicted etch time using the known etch depth d for the (damascene) trench structure and the predicted etch rate $\epsilon_{predicted}$ (i.e., $\tau_{predicted}=d/\epsilon_{predicted}$), and $\tau_{new}$ is the process recipe etch time for the upcoming run. Note that when $\lambda=0$, the new etch time is equivalent to the old etch time and, when $\lambda=1$, the new etch time is equivalent to the predicted etch time.

Figure 18:
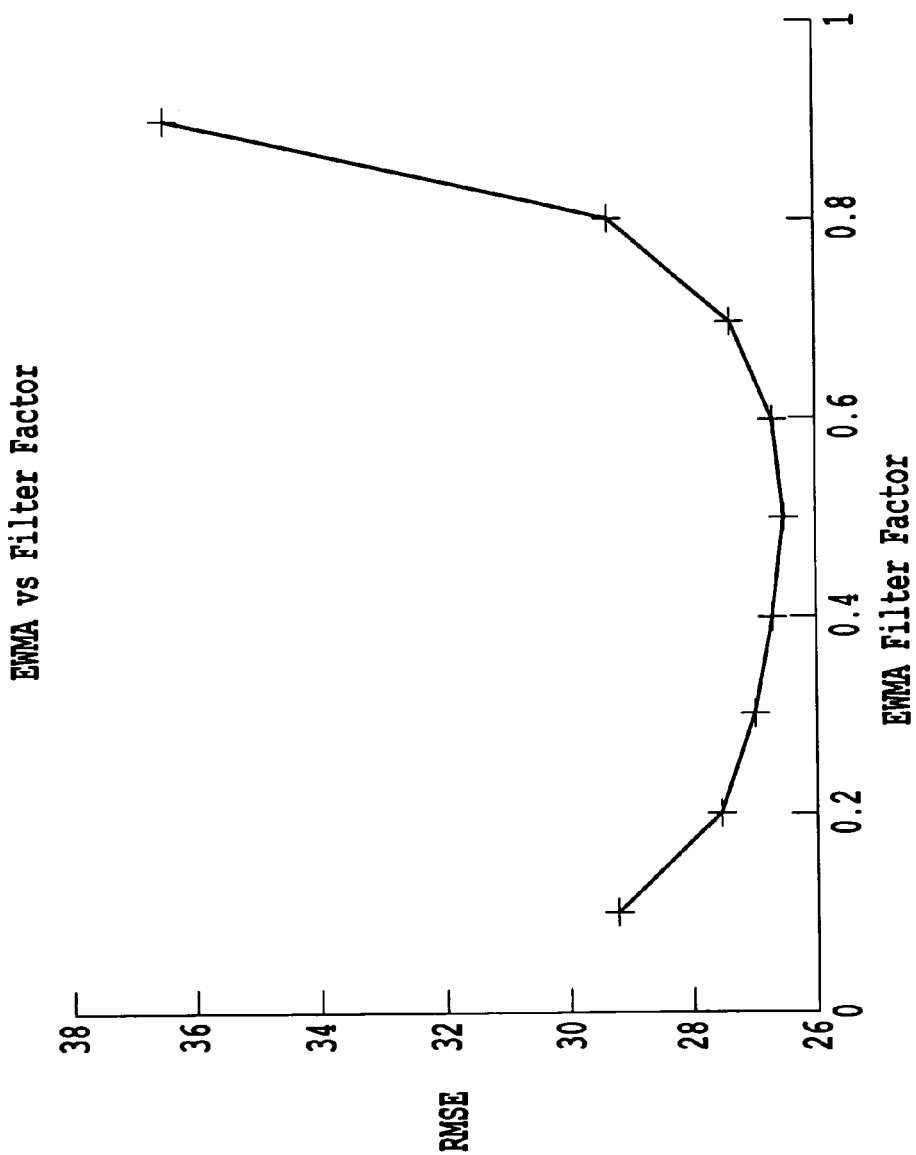
FIG. 18 presents an exemplary graph of the root mean square error (RMSE) as a function of the exponentially weighted moving average (EMWA) filter coefficient.

FIG. 18 presents a determination of the optimal filter coefficient $\lambda$ for the prediction of the mean trench etch depth in order to minimize the root mean square error (RMSE) and maximize the control algorithm stability. A series of fifty-two substrates were executed through process tool 10, comprising four wet clean cycles. A first wet clean preceded substrate number one (i.e., first wet clean cycle comprised substrates one to sixteen), a second wet clean preceded substrate number seventeen (i.e., second wet clean cycle included substrates seventeen to thirty-six), a third wet clean preceded substrate number thirty-seven (i.e., third wet clean cycle comprised substrates thirty-seven to forty-seven), and a fourth wet clean preceded substrate number forty-eight (i.e., fourth wet clean cycle comprised substrates forty-eight to fifty-two). During the execution of the fifty-two substrates, substrate numbers one through twenty-five were employed for the development of a process performance prediction model 110, and substrate numbers twenty-six through fifty-two were employed for model evaluation.

In general, when using substrate numbers twenty-six through fifty-two for model evaluation, a RMSE of the measured and predicted data was utilized to quantify the process performance prediction model 110 performance, where the RMSE is defined as follows:

$$RMSE = \sqrt{\frac{\sum_{i=1}^{n}(\varepsilon_{predicted}^{i}-\varepsilon_{measured}^{i})^2}{\sum_{i=1}^{n}(\varepsilon_{predicted}^{i}-\overline{\varepsilon}_{measured})^2}}. \quad (6)$$

In equation (6), the summation over i=1 to n represents the summation over the substrates (twenty-six through fifty-two) used for model evaluation, and $\overline{\epsilon}_{measured}$ represents the average measured etch rate. Clearly, by inspection of FIG. 18, the optimal filter coefficient $\lambda$ for the aforesaid exemplary process is $\lambda=0.5$. According to the process recipe correction filter 120, the process controller 130 can update the process recipe etch time prior to each substrate run.

Figure 19:
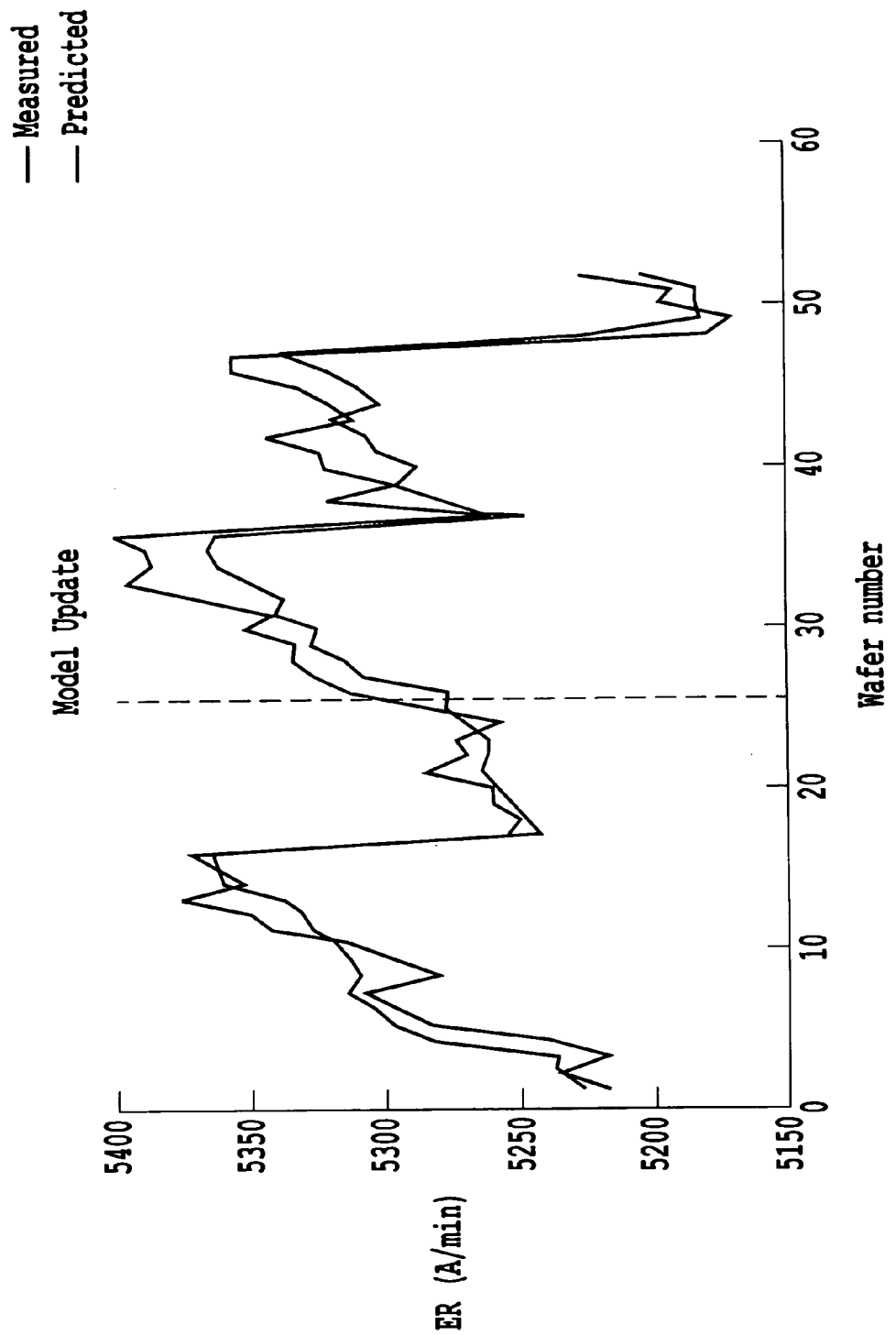
FIG. 19 presents an exemplary graph of the measured trench etch rate and the predicted trench etch rate as a function of substrate number for a filter coefficient of 0.5.

FIG. 19 presents the measured trench etch rate (Angstroms (A)/minute (min)) and the predicted trench etch rate, using the process performance prediction model 110 and the process recipe correction filter 120 ($\lambda=0.5$), as a function of substrate number. It is evident by inspection of FIG. 19 that the agreement between measured and predicted results is very good with an average error of 26.5 Angstroms/minute (for approximately a 5300 Angstroms/minute etch).

The average error can be further improved by implementing periodic updates of the process performance prediction model 110. At pre-determined intervals in substrate processing, a substrate can be transported from the process tool 10 to the metrology tool 140 for measurement of the process performance data. Following the above exemplary process, the process performance data can include the mean trench etch depth and the trench etch range. This data can be measured using conventional techniques in metrology tool 140, as described above.

Figure 20:
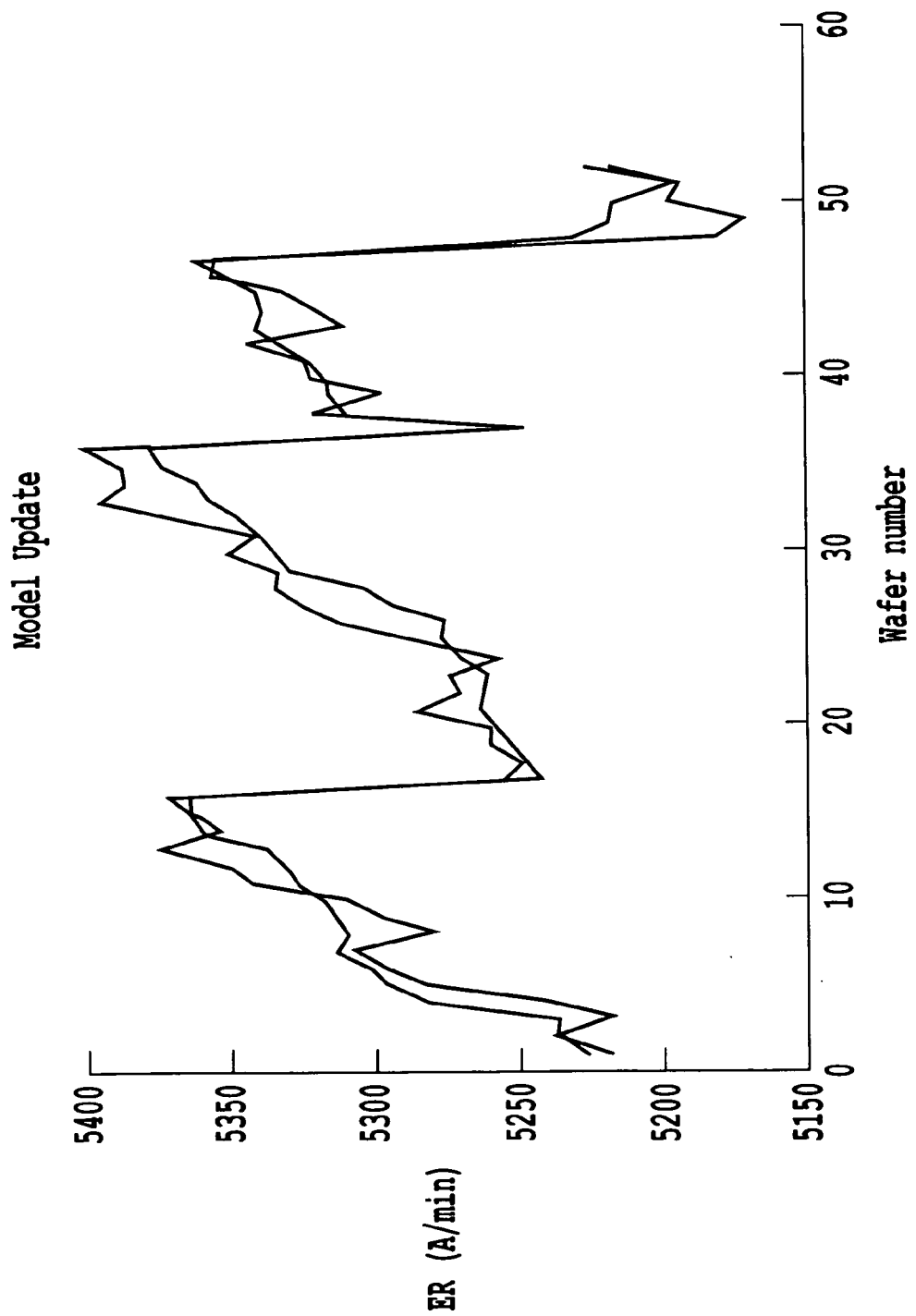
FIG. 20 presents an exemplary graph of the measured trench etch rate and the predicted trench etch rate as a function of substrate number using periodic updates of the process performance prediction model.

The measurement of process performance data can be submitted to the process performance model correction algorithm 150. Tool data and the corresponding measured process performance data are inserted with the tool data matrix $\overline{X}$ and the process performance data matrix $\overline{Y}$, and the correlation matrix $\overline{B}$ is re-evaluated using PLS analysis as described with reference to FIG. 16. The updated correlation matrix can then be submitted to the process performance prediction model 110 for replacement of the current process performance prediction model 110. FIG. 20 presents the data of FIG. 19 where the process performance prediction model 110 is updated periodically using the process performance correction algorithm 150. The average error is further reduced to 24.7 Angstroms/minute.

Figure 21:
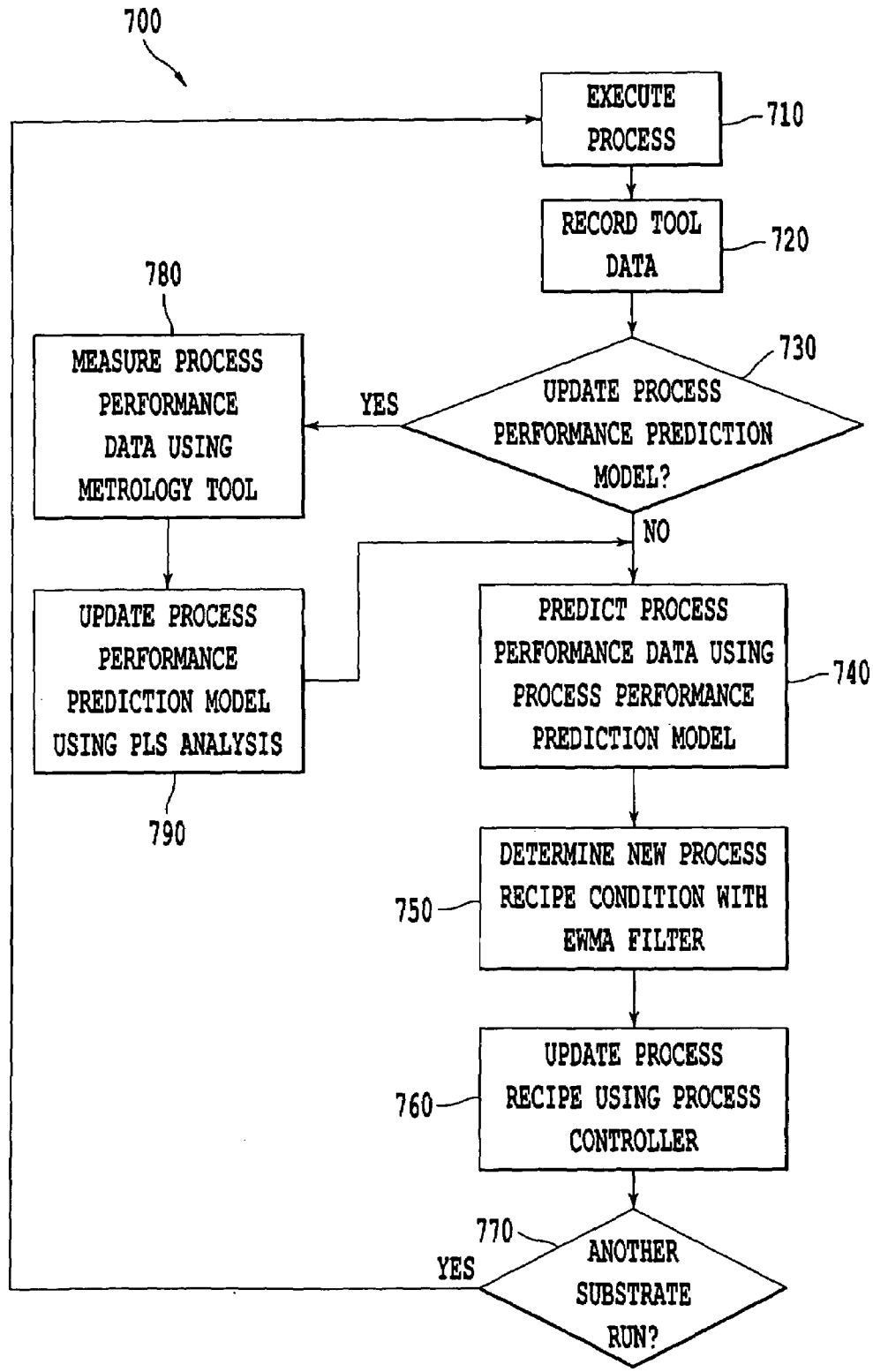
FIG. 21 presents a flow diagram of a method of controlling a process recipe for a material processing system according to an embodiment of the present invention.

FIG. 21 presents a method of controlling a process in a material processing system employing a process performance control system according to an embodiment of the present invention. The method includes a procedure 700 beginning with step 710 where a designated process is executed. For example, process execution can include chamber setup (e.g., loading the substrate to be processed, pumping down the vacuum chamber to a base pressure, initiating the flow of process gas, and adjusting the vacuum pump throttle valve to establish the chamber process pressure), initiating the process (e.g., igniting plasma via, for example, the application of RF power to an electrode as discussed with reference to FIGS. 2 through 5), and terminating a process (e.g., completing a process according to a process time set by the process recipe by terminating RF power, etc., and unloading a substrate). During the process in step 710, an observation of tool data is recorded in step 720. In step 730, a determination to update the process performance prediction model is made. If necessary, the substrate processed during the process of step 710 is transported to the metrology tool (as is described below with reference to steps 780 and 790). In step 740, the established process performance prediction model is used with the observed tool data to predict the process performance data, which includes projecting the recorded tool data onto the one or more correlation data (process performance prediction model) via, for example, vector multiplication (or matrix multiplication).

In step 750, the process recipe correction filter employs the EWMA filter and model prediction of process performance data to correct the process recipe by determining a process recipe correction. The correction to the process recipe can, for example, include a correction to the etch time. The EWMA filter employs a filter coefficient and, desirably, the selected filter coefficient is the optimal filter coefficient. In step 760, the process recipe is updated using the process controller prior to determining if another process is to be run in step 770.

If step 730 determines that the process performance prediction model is to be updated, then control passes to step 780. In step 780, process performance data is measured using the metrology tool and submitted to the process performance model correction algorithm. In step 790, the process performance model correction algorithm employs PLS analysis according to the procedures set forth above. The PLS analysis uses measured process performance data (from the metrology tool) and corresponding tool data in addition to the tool data and process performance data used for formulation of the current process performance prediction model. When appropriate (as deemed by the length of time to update the process performance prediction model relative to executing substrate runs), the process performance prediction model is updated.

Although only certain exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A material processing system comprising:
   a process tool; and
   a process performance control system configured to control said process tool, said process performance control system comprises a process performance controller coupled to said process tool, wherein said process performance controller comprises a process performance prediction model configured to receive tool data from a plurality of sensors associated with said process tool and predict process performance data based on said tool data, a process recipe correction filter configured to receive predicted process performance data from said process performance prediction model and determine a process recipe correction based on said predicted process performance data and a known value of the process recipe parameter to be corrected, said known value being measured from a preceding process run, and a process controller configured to update a process recipe for said process tool using said process recipe correction.

2. The material processing system as recited in claim 1, wherein said process performance data comprises at least one of etch depth, average etch depth, mean etch depth, and etch depth range.

3. The material processing system as recited in claim 1, wherein said tool data comprises at least one of a capacitor position, a forward radio frequency (RF) power, a reflected RF power, a voltage, a current, a phase, an impedance, a RF peak-to-peak voltage, a RF self-induced direct current bias, a chamber pressure, a gas flow rate, a temperature, a backside gas pressure, a backside gas flow rate, an electrostatic clamp voltage, an electrostatic clamp current, a focus ring thickness, RF hours, focus ring RF hours, and optical emission data.

4. The material processing system as recited in claim 1, wherein said process performance prediction model comprises an output from a partial least squares analysis.

5. The material processing system as recited in claim 1, wherein said process recipe correction filter comprises an exponentially weighted moving average filter.

6. The material processing system as recited in claim 1, wherein said process recipe correction comprises an etch time.

7. The material processing system as recited in claim 1, wherein said process performance control system further comprises a metrology tool and a process performance model correction algorithm.

8. The material processing system as recited in claim 7, wherein said metrology tool is coupled to said process tool and said process performance controller, and configured to measure process performance data.

9. The material processing system as recited in claim 8, wherein said process performance model correction filter comprises a partial least squares algorithm that uses said measured process performance data and corresponding tool data.

10. A process performance control system for controlling a process tool comprising:
    a process performance controller capable of being coupled to said process tool, said process performance controller comprises a process performance prediction model configured to receive tool data from a plurality of sensors associated with said process tool and predict process performance data based on said tool data, a process recipe correction filter configured to receive predicted process performance data from said process performance prediction model and determine a process recipe correction based on said predicted process performance data and a known value of the process recipe parameter to be corrected, said known value being measured from a preceding process run, and a process controller configured to update a process recipe for said process tool using said process recipe correction.

11. The process performance control system as recited in claim 10, wherein said process performance data comprises at least one of mean etch depth and etch depth range.

12. The process performance control system as recited in claim 10, wherein said process performance prediction model is configured to receive tool data comprising at least one of a capacitor position, a forward RF power, a reflected RF power, a voltage, a current, a phase, an impedance, a RE peak-to-peak voltage, a RF self-induced DC bias, a chamber pressure, a gas flow rate, a temperature, a backside gas pressure, a backside gas flow rate, an electrostatic clamp voltage, an electrostatic clamp current, a focus ring thickness, RF hours, focus ring RF hours, and optical emission data.

13. The process performance control system as recited in claim 10, wherein said process performance prediction model comprises an output from a partial least squares analysis.

14. The process performance control system as recited in claim 10, wherein said process recipe correction filter comprises an exponentially weighted moving average filter.

15. The process performance control system as recited in claim 10, wherein said process recipe correction comprises an etch time, a RF power, a pressure, a flow rate, a concentration, and a temperature.

16. The process performance control system as recited in claim 10, wherein said process performance control system further comprises a metrology tool capable of being coupled to said process tool and coupled to said process performance controller, and a process performance model correction algorithm.

17. The process performance control system as recited in claim 16, wherein said metrology tool is configured to measure process performance data.

18. The process performance control system as recited in claim 17, wherein said process performance model correction algorithm employs partial least squares analysis using said measured process performance data and corresponding tool data.

19. A material process system comprising:
a process tool; and
means for controlling said process tool, said means for controlling comprising means for predicting process performance data using tool data received from a plurality of sensors associated with said process tool, means for determining a process recipe correction using the predicted process performance data and a known value of the process recipe parameter to be corrected, the known value being measured from a preceding process run, and means for updating a process recipe for said process tool using said process recipe correction.

20. A method for controlling a process tool of a material processing system, the method comprising the steps of:
executing a first process in said process tool using a process recipe;
recording tool data for said first process, said tool data comprises a plurality of tool data parameters obtained from a plurality of sensors associated with the process tool;
predicting process performance data from said tool data for said first process using a process performance prediction model, said process performance data comprises one or more process performance data parameters;
determining a process recipe correction from said predicted process performance data and a known value of the process recipe parameter to be corrected, the known value being measured from a preceding process run using a process recipe correction filter;
updating said process recipe by incorporating said process recipe correction using a process controller coupled to said process tool; and
executing a second process in said process tool using said updated process recipe.

21. The method for controlling a process tool as recited in claim 20, wherein said method further comprises updating said process performance prediction model.

22. The method for controlling a process tool as recited in claim 21, wherein said updating said process performance prediction model comprises measuring process performance data for said first process in said process tool, and determining a correction to said process performance prediction model using said measured process performance data for said first process, said recorded tool data for said first process, and partial least squares analysis.

23. The method for controlling a process tool as recited in claim 20, wherein said process recipe comprises an etch time, a RF power, a pressure, a flow rate, a concentration, and a temperature.

24. The method for controlling a process tool as recited in claim 20, wherein said updated process recipe comprises an updated etch time.

25. The method for controlling a process tool as recited in claim 20, wherein said process performance data comprises at least one of mean etch depth and etch depth range.

26. The method for controlling a process tool as recited in claim 20, wherein said tool data comprises at least one of a capacitor position, a forward RE power, a reflected RF power, a voltage, a current, a phase, an impedance, a RE peak-to-peak voltage, a RE self-induced DC bias, a chamber pressure, a gas flow rate, a temperature, a backside gas pressure, a backside gas flow rate, an electrostatic clamp voltage, an electrostatic clamp current, a focus ring thickness, RE hours, focus ring RE hours, and optical emission data.

27. The method for controlling a process tool as recited in claim 20, wherein said process performance prediction model comprises an output from a partial least squares analysis.

28. The method for controlling a process tool as recited in claim 20, wherein said determining a process recipe comprises using an exponentially weighted moving average filter.

29. The method for controlling a process tool as recited in claim 20, wherein said method further comprises:
measuring process performance data using a metrology tool; and
correcting said process performance prediction model using said measured process performance data and said measured tool data.

30. The method for controlling a process tool as recited in claim 29, wherein said correcting said process performance prediction model comprises partial least squares analysis.

31. The material processing system of claim 5, wherein said exponentially weighted moving average filter is configured to correct an etch time based on a measured etch time of an immediately preceding etch process, a predicted value for the etch time and a filter constant.

32. The material processing system of claim 14, wherein said exponentially weighted moving average filter is configured to correct an etch time based on a measured etch time of an immediately preceding etch process, a predicted value for the etch time and a filter constant.

33. The method of claim 28, wherein said determining a process recipe comprises determining a corrected etch time based on a measured etch time of an immediately preceding etch process, a predicted value for the etch time and a filter constant.

* * * * *